US012573540B2

(12) United States Patent
Furukawa et al.

(10) Patent No.: US 12,573,540 B2
(45) Date of Patent: Mar. 10, 2026

(54) INDUCTOR

(71) Applicant: NITTO DENKO CORPORATION, Osaka (JP)

(72) Inventors: Yoshihiro Furukawa, Osaka (JP); Keisuke Okumura, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 879 days.

(21) Appl. No.: 17/633,443

(22) PCT Filed: Jun. 19, 2020

(86) PCT No.: PCT/JP2020/024103
§ 371 (c)(1),
(2) Date: Feb. 7, 2022

(87) PCT Pub. No.: WO2021/029142
PCT Pub. Date: Feb. 18, 2021

(65) Prior Publication Data

US 2022/0285085 A1 Sep. 8, 2022

(30) Foreign Application Priority Data

Aug. 9, 2019 (JP) ................................ 2019-147348
Feb. 17, 2020 (JP) ................................ 2020-024310

(51) Int. Cl.
*H01F 27/28* (2006.01)
*H01F 27/245* (2006.01)
*H01F 27/36* (2006.01)

(52) U.S. Cl.
CPC ....... *H01F 27/2866* (2013.01); *H01F 27/245* (2013.01); *H01F 27/288* (2013.01); *H01F 27/36* (2013.01)

(58) Field of Classification Search
CPC .. H01F 27/2866; H01F 27/245; H01F 27/288; H01F 27/36; H01F 3/14;
(Continued)

(56) References Cited

U.S. PATENT DOCUMENTS 6,392,525 B1 5/2002 Kato et al.
2002/0020052 A1 2/2002 Ito et al.
(Continued)

FOREIGN PATENT DOCUMENTS

CN 201594436 U 9/2010
CN 201845587 U 5/2011
(Continued)

OTHER PUBLICATIONS

Extended European Search Report, issued by the European Patent Office on Jul. 24, 2023, in connection with European Patent Application No. 20851819.1.
(Continued)

*Primary Examiner* — Tuyen T Nguyen
(74) *Attorney, Agent, or Firm* — Edwards Neils LLC; Jean C. Edwards, Esq.

(57) ABSTRACT

An inductor includes a first wire adjacent to a second wire and separated by an interval; a first magnetic layer having first and second surfaces separated from each other by an interval, and an inner peripheral surface in contact with an outer peripheral surface of the first and second wires between the first and second surfaces; a second magnetic layer disposed on the first surface; and a third magnetic layer disposed on the second surface. The second magnetic layer has a third surface facing and separated from the first surface by an interval in the thickness direction. The relative permeability of each of the second and third magnetic layers is higher than that of the first magnetic layer. The inductor includes a suppression portion located between the first and
(Continued)

second wires which suppresses the magnetic coupling between the first and second wires.

14 Claims, 8 Drawing Sheets

(58) Field of Classification Search
CPC ................. H01F 27/2823; H01F 27/34; H01F 2003/106; H01F 3/10; H01F 2017/048; H01F 17/04; H01F 27/2804; H01F 27/24; H01F 37/00
See application file for complete search history.

(56) References Cited

U.S. PATENT DOCUMENTS

| | | | | |
|---|---|---|---|---|
| 2006/0152321 | A1 | 7/2006 | Jung et al. | |
| 2008/0003760 | A1 | 1/2008 | Gardner et al. | |
| 2013/0168149 | A1 | 7/2013 | Gundel | |
| 2014/0253276 | A1 | 9/2014 | Iwasaki et al. | |
| 2015/0170823 | A1 | 6/2015 | Jeong et al. | |
| 2016/0217908 | A1* | 7/2016 | Jeong | H01F 27/292 |
| 2016/0351314 | A1 | 12/2016 | Jeong et al. | |
| 2018/0061553 | A1* | 3/2018 | Jeon | H01F 17/04 |
| 2018/0218817 | A1 | 8/2018 | Kobayashi et al. | |
| 2019/0014655 | A1 | 1/2019 | Yazaki et al. | |
| 2019/0043659 | A1 | 2/2019 | Jeong | |
| 2019/0051449 | A1 | 2/2019 | Cappabianca et al. | |
| 2019/0172618 | A1 | 6/2019 | Kim et al. | |
| 2019/0221365 | A1* | 7/2019 | Cappabianca | H01F 19/00 |

FOREIGN PATENT DOCUMENTS

| | | | |
|---|---|---|---|
| CN | 104036917 | A | 9/2014 |
| CN | 104733154 | A | 6/2015 |
| EP | 2 963 094 | A1 | 1/2016 |
| JP | S59-144107 | A | 8/1984 |
| JP | S62-169407 | A | 7/1987 |
| JP | H01-146424 | U | 10/1989 |
| JP | 3-25378 | Y2 | 6/1991 |
| JP | H05-152130 | A | 6/1993 |
| JP | H10-144526 | A | 5/1998 |
| JP | 10-270256 | A | 10/1998 |
| JP | 2000-36414 | A | 2/2000 |
| JP | 2004-363291 | A | 12/2004 |
| JP | 2008-288370 | A | 11/2008 |
| JP | 2012-526383 | A | 10/2012 |
| JP | 2013-543635 | A | 12/2013 |
| JP | 2014-165363 | A | 9/2014 |
| JP | 2017-005115 | A | 1/2017 |
| JP | 2018-092092 | A | 6/2018 |
| JP | 2018-125527 | A | 8/2018 |
| TW | 201530581 | A | 8/2015 |
| WO | 2010/129228 | A1 | 11/2010 |
| WO | 2015/161035 | A1 | 10/2015 |
| WO | 2018/057227 | A1 | 3/2018 |

OTHER PUBLICATIONS

International Search Report Issued in PCT/JP2020/024103 on Aug. 25, 2020.
Written Opinion Issued in PCT/JP2020/024103 on Aug. 25, 2020.
Office Action, issued by the Taiwanese Intellectual Property Office on Jun. 13, 2024, in connection with Taiwanese Patent Application No. 109121807.
Office Action, issued by the Korean Intellectual Property Office on Sep. 4, 2024, in connection with Korean Patent Application No. 10-2022-7003485.
Office Action, issued by the Japanese Patent Office on Oct. 15, 2024, in connection with Japanese Patent Application No. 2020-024310.
International Preliminary Report on Patentability issued by WIPO on Feb. 8, 2022, in connection with International Patent Application No. PCT/JP2020/024103.
Office Action, issued by the Japanese Patent Office on Apr. 2, 2024, in connection with Japanese Patent Application No. 2020-024310.
Office Action, issued by the Chinese Intellectual Property Office on Mar. 14, 2025, in connection with Chinese Patent Application No. 202080056567.4.
Office Action, issued by the Korean Intellectual Property Office on May 26, 2025, in connection with Korean Patent Application No. 10-2022-7003485.
Notice of Allowance, issued by the Korean Intellectual Property Office on Sep. 4, 2025, in connection with Korean Patent Application No. 10-2022-7003485.
Office Action, issued by China National Intellectual Property Administration on Sep. 29, 2025, in connection with Chinese Patent Application No. 202080056567.4.

* cited by examiner

INDUCTOR

CROSS-REFERENCE TO RELATED APPLICATIONS

The present application is a 35 U.S.C. 371 National Stage Entry PCT/JP2020/024103, filed on Jun. 19, 2020, which claims priority from Japanese Patent Application Nos. 2019-147348, filed on Aug. 9, 2019, and 2020-024310, filed on Feb. 17, 2020, the contents of all of which are herein incorporated by reference in their entirety.

TECHNICAL FIELD

The present invention relates to an inductor.

BACKGROUND ART

Inductors have been known for being mounted, for example, on an electronic device and used as the passive components in the voltage conversion member.

For example, an inductor including a main body portion made of a magnetic material and an internal conductor made of copper and embedded the main body has been proposed (for example, see Patent document 1 below).

CITATION LIST

Patent Document

Patent Document 1: Japanese Unexamined Patent Publication No. H10-144526

SUMMARY OF THE INVENTION

Problem to be Solved by the Invention

With miniaturization and higher performance of electronic devices in recent years, there is a need for inductors having the same properties. To achieve such miniaturization and increased inductance, there is a need for inductors including internal conductors closely packed therein. However, there is a disadvantage that such an inductor including closely adjacent internal conductors causes a magnetic coupling (crosstalk) between the adjacent conductors by the magnetic material of the inductor.

On the other hand, lengthening the interval between the adjacent internal conductors can suppress the above-described crosstalk, but adversely reduces the inductance.

Meanwhile, there is another need for inductors having excellent superimposed DC current characteristics.

The present invention provides an inductor that has excellent superimposed DC current characteristics, and can suppress the crosstalk between the adjacent wires while suppressing the reduction in the inductance.

Means for Solving the Problem

The present invention [1] includes an inductor including a first wire and a second wire adjacent to each other and separated by an interval; a first magnetic layer having a first surface continuing in a surface direction, a second surface separated from the first surface by an interval in a thickness direction and continuing in the surface direction, an inner peripheral surface located between the first surface and the second surface and being in contact with an outer peripheral surface of the first wire and an outer peripheral surface of the second wire; a second magnetic layer disposed on the first surface; and a third magnetic layer disposed on the second surface, wherein the second magnetic layer has a third surface facing the first surface and separated from the first surface by an interval in the thickness direction, a relative permeability of each of the second magnetic layer and the third magnetic layer is higher than a relative permeability of the first magnetic layer, the inductor further comprises a suppression portion that is located between the first wire and the second wire when being projected in the thickness direction and is configured to suppress magnetic coupling between the first wire and the second wire, and the suppression portion includes a first suppression portion located between the first surface and the third surface.

The inductor includes the second magnetic layer and third magnetic layer each having a relative permeability higher than the relative permeability of the first magnetic layer, and the suppression portion having the first suppression portion located between the first surface and the third surface. Thus, the inductor has excellent superimposed DC current characteristics, and can suppress the crosstalk between the first wire and the second wire while suppressing the reduction in the inductance.

The present invention [2] includes the inductor described in [1], wherein the first suppression portion faces the first surface.

The inductor includes the first suppression portion facing the first surface, and thus can efficiently suppress the crosstalk between the first wire and the second wire.

The present invention [3] includes the inductor described in [1] or [2] above, wherein the first suppression portion is exposed from the third surface.

The inductor includes the first suppression portion exposed from the third surface, and this can simplify the formation of the first suppression portion.

The present invention [4] includes the inductor described in any one of the above-described [1] to [3], wherein a length of the first suppression portion in the thickness direction is larger than a length of the first suppression portion in an adjacent direction in which the first wire and the second wire are adjacent to each other.

The inductor can suppress the reduction in the inductance as much as possible, and efficiently suppress the crosstalk between the first wire and the second wire.

The present invention [5] includes the inductor described in any one of the above-described [1] to [4], wherein the first suppression portion is a slit formed in the second magnetic layer.

The inductor includes the first suppression portion that is a slit, and thus has a simple structure and allows air with the lowest relative permeability to exist in the slit. Hence, the crosstalk between the first wire and the second wire can surely be suppressed.

The present invention [6] includes the inductor described in any one of the above-described [1] to [4], wherein the first suppression portion is a first filling portion filling a void formed in the second magnetic layer, and a relative permeability of the first filling portion is lower than the relative permeability of the first magnetic layer.

The inductor includes the first suppression portion that is the first filling portion having a relative permeability lower than that of the first magnetic layer. Thus, the first filling portion can surely suppress the crosstalk between the first wire and the second wire.

The present invention [7] includes the inductor described in any one of the above-described [1] to [6], further including a processing stabilization layer disposed on the third surface of the second magnetic layer.

The inductor includes the processing stabilization layer, and thus allows the second magnetic layer to have excellent processing stability.

The present invention [8] includes the inductor described in any one of the above-described [1] to [7], wherein the third magnetic layer has a fourth surface facing the second surface and separated from the second surface by an interval in the thickness direction, and the suppression portion further includes a second suppression portion located between the second surface and the fourth surface.

The inductor includes the suppression portion further including the second suppression portion located between the second surface and the fourth surface, and thus can suppress the crosstalk between the first wire and the second wire while suppressing the reduction in the inductance.

The present invention [9] includes the inductor described in [8], wherein the second suppression portion faces the second surface.

The inductor includes the second suppression portion facing the second surface, and thus can efficiently suppress the crosstalk between the first wire and the second wire.

The present invention [10] includes the inductor described in [8] or [9] above, wherein the second suppression portion is exposed from the fourth surface.

The inductor includes the second suppression portion exposed from the fourth surface, and this can simplify the formation of the second suppression portion.

The present invention [11] includes the inductor described in any one of the above-described [8] to [10], wherein a length of the second suppression portion in the thickness direction is larger than a length of the second suppression portion in the adjacent direction in which the first wire and the second wire are adjacent to each other.

The inductor can efficiently suppress the crosstalk between the first wire and the second wire while suppressing the reduction in the inductance as much as possible.

The present invention [12] includes the inductor described in any one of the above-described [8] to [11], wherein the second suppression portion is a second slit formed in the third magnetic layer.

The inductor includes the second suppression portion that is the second slit, and thus has a simple structure and allows air with the lowest relative permeability to exist in the second slit. Hence, the crosstalk between the first wire and the second wire can surely be suppressed.

The present invention [13] includes the inductor described in any one of the above-described [8] to [11], wherein the second suppression portion is a second filling portion filling a void formed in the third magnetic layer, and a relative permeability of the second filling portion is lower than the relative permeability of the first magnetic layer.

The inductor includes the second suppression portion that is the second filling portion having a relative permeability lower than that of the first magnetic layer. Thus, the second filling portion can surely suppress the crosstalk between the first wire and the second wire.

The present invention [14] includes the inductor described in any one of the above-described [8] to [13], further including a second processing stabilization layer disposed on the fourth surface of the third magnetic layer.

The inductor includes the second processing stabilization layer, and thus allows the third magnetic layer have an excellent surface workability.

Effects of the Invention

The inductor of the present invention has excellent superimposed DC current characteristics, and can suppress the crosstalk between the first wire and the second wire while suppressing the reduction in the inductance.

BRIEF DESCRIPTION OF THE DRAWINGS

FIG. 2A illustrates a step of preparing the first and second wires and the first to third magnetic sheets. FIG. 2B illustrates a step of the heat press of the wires and magnetic sheets. FIG. 2C illustrates a step of forming a slit and a second slit.

FIG. 16B illustrates a step of disposing a processing stabilization layer and a second processing stabilization layer. FIG. 16B illustrates a step of forming the slit and the second slit.

DESCRIPTION OF THE EMBODIMENTS

Figure 1:
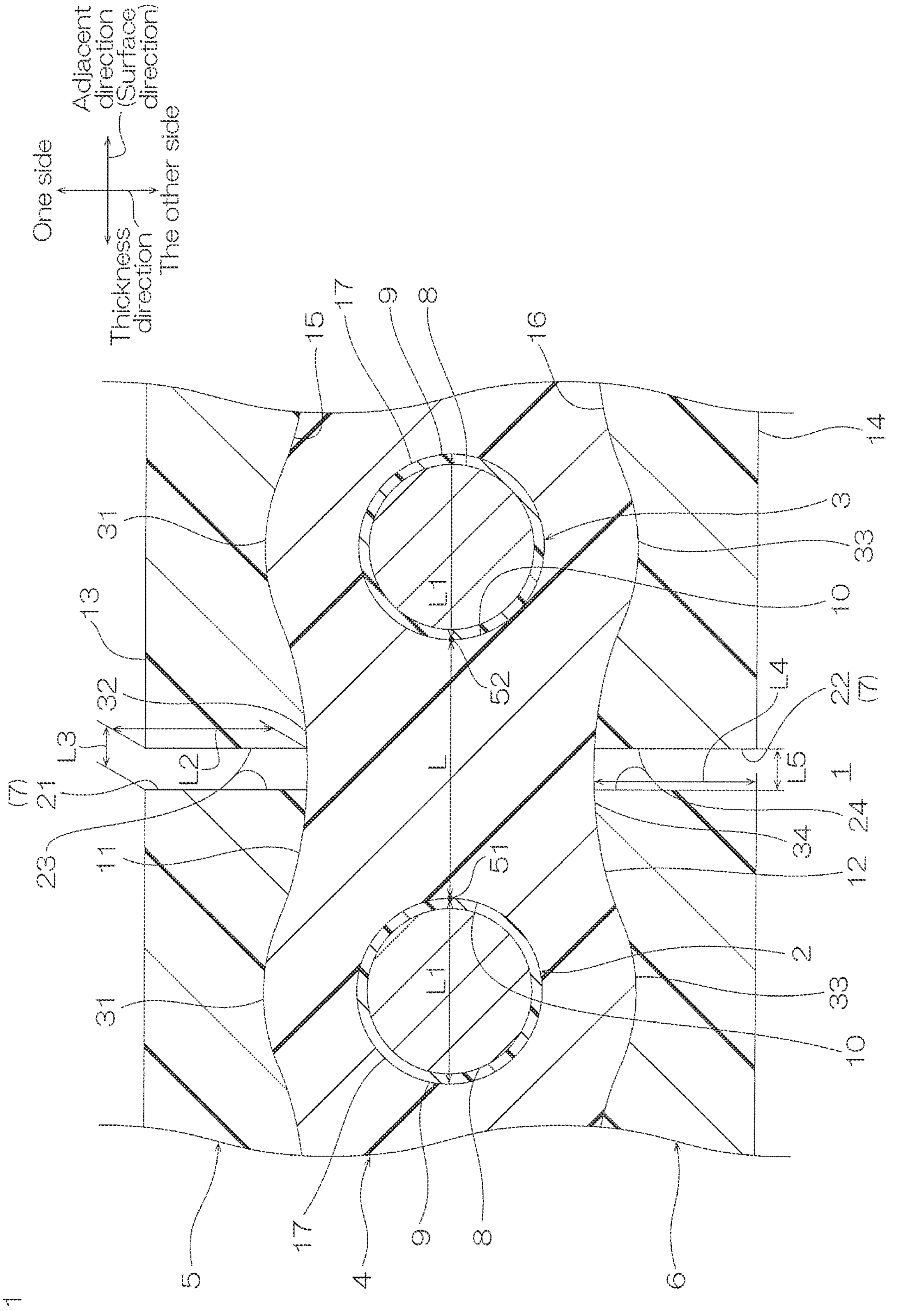
FIG. 1 is a frontal cross-sectional view of an embodiment of the inductor of the present invention.

An embodiment of the inductor of the present invention is described with reference to FIG. 1 to FIG. 2C. To clearly show the relative disposition of a first wire 2 and a second wire 3, a first magnetic sheet 25 through a third magnetic sheet 27, and a first magnetic layer 4 through a third magnetic layer 6 (all described below); a conductive wire 8 and an insulating film 9 (described below) are omitted, and only the first wire 2 and second wire 3 (described below) are illustrated in FIG. 2A to FIG. 2C.

As illustrated in FIG. 1, an inductor 1 has a sheet shape extending in a surface direction. The inductor 1 includes the first wire 2, second wire 3, first magnetic layer 4, second magnetic layer 5, third magnetic layer 6, and a suppression portion 7.

The first wire 2 and second wire 3 are adjacent to each other, holding an interval therebetween. The first wire 2 and second wire 3 are parallel to each other. The first wire 2 and second wire 3 each have an approximately circular shape when being cut in a cross section (frontal cross section) orthogonal to a direction in which the currents are transmitted (a direction of the thickness of the sheet of the drawing paper of FIG. 1) (a longitudinal direction). Each of the first wire 2 and second wire 3 includes the conductive wire 8 and the insulating film 9 covering the conductive wire 8.

The conductive wire 8 is a conductor line. The conductive wire 8 has an approximately circular shape sharing its central axis with each of the first wire 2 and second wire 3 in the cross-sectional view. Examples of the material of the conductive wire 8 include metal conductors such as copper, silver, gold, aluminum, nickel, and alloys thereof. Preferably, copper is used. The conductive wire 8 may have a single-layer structure, or a multiple-layered structure in which a surface of the core conductor (for example, copper) is plated (for example, with nickel). The conductive wire 8 has a diameter of, for example, 50 μm or more, and 5000 μm or less.

The insulating film 9 protects the conductive wire 8 from chemicals or water, and prevents the short circuit of the conductive wire 8 and the first magnetic layer 4. The insulating film 9 covers the whole of an outer peripheral surface (circumferential surface) of the conductive wire 8. The insulating film 9 has an approximately circular ring shape sharing its central axis (center) with each of the first wire 2 and second wire 3 in cross-sectional view. The insulating film 9 forms an outer peripheral surface 17 of each of the first wire 2 and second wire 3. Examples of the material of the insulating film 9 include insulating resins such as polyvinyl formal, polyester, polyester imide, polyamide (including nylon), polyimide, polyamide imide, and polyurethane. These can be used singly or in combination of two or more. The insulating film 9 may have a single-layer structure or a multiple-layered structure. The insulating film 9 has a thickness of, for example, 1 μm or more, and 100 μm or less. The ratio of the radius of the conductive wire 8 to the thickness of the insulating film 9 is, for example, 2 or more, and 500 or less.

Each of the first wire 2 and second wire 3 has a diameter L1 (the average value of the maximum lengths) is, for example, 25 μm or more, and 2000 μm or less.

The lower limit of an interval L between the adjacent first wire 2 and second wire 3 is, for example, 10, preferably 50, and the upper limit thereof is, for example, 5,000, preferably 3,000. The upper limit of the ratio (L1/L) of the diameter L1 of each of the first wire 2 and second wire 3 to the interval L between the adjacent first wire 2 and second wire 3 is, for example, 200, preferably 50, more preferably 30, even more preferably 20, and the lower limit thereof is, for example, 0.01. When the ratio (L1/L) is the above-described upper limit or less, the reduction in the inductance can be suppressed.

The first magnetic layer 4, the second magnetic layer 5, and the third magnetic layer 6 cooperate to improve the superimposed DC current characteristics of the inductor 1 while improving the inductance of the inductor 1.

The first magnetic layer 4 has a sheet shape extending in both of the longitudinal direction in which the first wire 2 and second wire 3 extend and the adjacent direction (the surface direction) in which the first wire 2 and second wire 3 are adjacent to each other. The first magnetic layer 4 has a first surface 11, a second surface 12, and an inner peripheral surface 10.

The first surface 11 continues in the surface direction of the first magnetic layer 4. The first surface 11 has a shape (for example, a wave shape) corresponding to the first wire 2 and second wire 3. The first surface 11 is located nearer to one side in the thickness direction than the first wire 2 and second wire 3 are.

In detail, when having the above-described wave shape, the first surface 11 has a convex portion 31 and a concave portion 32. The convex portion 31 goes along the outer peripheral surface 17 of each of the first wire 2 and second wire 3.

The concave portion 32 is located between two convex portions 31 and caves in toward the other side in the thickness direction. When being projected in the adjacent direction, the concave portion 32 does not overlap the first wire 2 and second wire 3 and is located near to the one side in the thickness direction than the first wire 2 and second wire 3 are.

The second surface 12 is separated from the first surface 11 by an interval at the other side in the thickness direction. The second surface continues in the surface direction of the first magnetic layer 4. The second surface 12 has a shape (for example, a wave shape) corresponding to the first wire 2 and second wire 3. The second surface 12 is located nearer to the other side in the thickness direction than the first wire 2 and second wire 3 are.

In detail, when having the above-described wave shape, the second surface 12 has a second convex portion 33 and a second concave portion 34. The second convex portion 33 goes along the outer peripheral surface 17 of each of the first wire 2 and second wire 3.

The second concave portion 34 is located between two second convex portions 33 and caves in toward the one side in the thickness direction. When being projected in the adjacent direction, the second concave portion 34 does not overlap the first wire 2 and second wire 3 and is located near to the other side in the thickness direction than the first wire 2 and second wire 3 are.

The inner peripheral surface 10 is located between the first surface 11 and the second surface 12. The inner peripheral surface 10 is formed in the middle of the first magnetic layer 4 in the thickness direction. The inner peripheral surface 10 is in contact with the outer peripheral surface 17 of each of the first wire 2 and second wire 3 and covers the outer peripheral surface 17.

The relative permeability and material of the first magnetic layer 4 are described in detail below.

The second magnetic layer 5 is located on the first surface 11 of the first magnetic layer 4. The second magnetic layer 5 has a sheet shape extending in the surface direction. The second magnetic layer 5 has a third surface 13 and a fifth surface 15.

The third surface 13 faces the first surface 11 at the one side in the thickness direction, holding an interval therebetween. The third surface 13 forms one surface of the inductor 1 in the thickness direction. The third surface 13 is flat or, although not illustrated, may have a wave shape along the first surface 11.

The fifth surface 15 faces the third surface 13 at the other side in the thickness direction, holding an interval therebetween. The fifth surface 15 is in contact with the first surface 11.

The relative permeability and material of the second magnetic layer 5 are described in detail below.

The third magnetic layer 6 is located on the second surface 12 of the first magnetic layer 4. The third magnetic layer 6 has a sheet shape extending in the surface direction. The third magnetic layer 6 has a fourth surface 14 and a sixth surface 16.

The fourth surface 14 faces the second surface 12 at the other side in the thickness direction, holding an interval therebetween. The fourth surface 14 forms the other surface of the inductor 1 in the thickness direction. The fourth surface 14 is flat or, although not illustrated, may have a wave shape along the second surface 12.

Each of the second magnetic layer 5 and the third magnetic layer 6 has a higher relative permeability than the relative permeability of the first magnetic layer 4. The relative permeability of each of the second magnetic layer 5 and the third magnetic layer 6 is higher than the relative permeability of the first magnetic layer 4. Thus, the inductor 1 has excellent superimposed DC current characteristics and maintains a high inductance.

All the relative permeabilities of the first magnetic layer 4, the second magnetic layer 5, and the third magnetic layer 6 are measured at a frequency of 10 MHz. Alternatively, the relative permeabilities of the first magnetic sheet 25, the second magnetic sheet 26, and the third magnetic sheet 27, which are precursors of the first magnetic layer 4, the second magnetic layer 5, and the third magnetic layer 6, respectively, may previously be measured, and the previously measured relative permeabilities can be deemed substantially the same values as the relative permeabilities of the first magnetic layer 4, the second magnetic layer 5 and the third magnetic layer 6.

Specifically, the lower limit of the ratio R1 of the relative permeability of the second magnetic layer 5 to the relative permeability of the first magnetic layer 4 is, for example, 1.1, preferably 1.5, more preferably 2, even more preferably 5, particularly preferably 10, most preferably 15, and the upper limit thereof is, for example, 10,000. The ratio R2 of the relative permeability of the third magnetic layer 6 to the relative permeability of the first magnetic layer 4 is the same as the above-described R1. When the ratio R1 and/or ratio R2 are/is the above-described lower limit or more, the superimposed DC current characteristics are further improved.

The first magnetic layer 4, the second magnetic layer 5, and the third magnetic layer 6 contain magnetic particles. Specific examples of the materials of the first magnetic layer 4, the second magnetic layer 5, and the third magnetic layer 6 include a magnetic composition containing magnetic particles and a binder.

The magnetic material making up the magnetic particles is, for example, a soft magnetic body and a hard magnetic body. For the inductance and superimposed DC current characteristics, preferably the soft magnetic body is used.

Examples of the soft magnetic body include a single metal body containing one metal element as a pure material; and an alloy body that is an eutectic body (mixture) of one or more metal element(s) (the first metal element(s)), and one or more metal element(s) (the second metal element(s)) and/or a non-metal element(s) (such as carbon, nitrogen, silicon, and phosphorus). These can be used singly or in combination of two or more.

Examples of the single metal body include a single metal consisting of one metal element (the first metal element). The first metal element is appropriately selected from metal elements that can be contained as the first metal element of the soft magnetic body, such as iron (Fe), cobalt (Co), nickel (Ni), and other metal elements.

The single metal body is, for example, in a state in which the single metal body includes a core including only one metal element and a surface layer containing an inorganic and/or organic material(s) that modifies the whole or a part of the surface of the core, or a state in which an organic metal compound or inorganic metal compound containing the first metal element is (thermally) decomposed. A more specific example of the latter state is iron powder (may be referred to as carbonyl iron powder) made of a thermally decomposed organic iron compound (specifically, carbonyl iron) including iron as the first metal element. The position of the layer including the inorganic and/or organic material(s) that modifies a part including only one metal element is not limited to the above-described surface. An organic metal compound or inorganic metal compound from which the single metal body can be obtained is not limited, and can appropriately be selected from known or common organic metal compounds and inorganic metal compounds from which the single metal body can be obtained.

The alloy body is an eutectic body of one or more metal element(s) (the first metal element(s)), and one or more metal element(s) (the second metal element(s)) and/or a non-metal element(s) (such as carbon, nitrogen, silicon, and phosphorus), and is not especially limited as long as the alloy body can be used as an alloy body of the soft magnetic body.

The first metal element is an essential element in the alloy body. Examples thereof include iron (Fe), cobalt (Co), and nickel (Ni). When the first metal element is Fe, the alloy body is an Fe-based alloy. When the first metal element is Co, the alloy body is a Co-based alloy. When the first metal element is Ni, the alloy body is a Ni-based alloy.

The second metal element is an element (accessory component) secondarily contained in the alloy body, and a metal element compatible (eutectic) with the first metal element. Examples thereof include iron (Fe) (when the first metal element is other than Fe), cobalt (Co) (when the first metal element is other than Co), nickel (Ni) (when the first metal element is other than Ni), chromium (Cr), aluminum (Al), silicon (Si), copper (Cu), silver (Ag), manganese (Mn), calcium (Ca), barium (Ba), titanium (Ti), zirconium (Zr), hafnium (Hf), vanadium (V), niobium (Nb), tantalum (Ta), molybdenum (Mo), tungsten (W), ruthenium (Ru), rhodium (Rh), zinc (Zn), gallium (Ga), indium (In), germanium (Ge), tin (Sn), lead (Pb), scandium (Sc), yttrium (Y), strontium (Sr), and various rare-earth elements. These can be used singly or in combination of two or more.

The non-metal element is an element (accessory component) secondarily contained in the alloy body, and a non-metal element compatible (eutectic) with the first metal element. Examples thereof include boron (B), carbon (C), nitrogen (N), silicon (Si), phosphorus (P), and sulfur (S). These can be used singly or in combination of two or more.

Examples of the Fe-based alloy as an exemplary alloy body include magnetic stainless steels (Fe—Cr—Al—Si Alloys) (including an electromagnetic stainless steel), sendust alloys (Fe—Si—Al alloys) (including a super sendust alloy), permalloys (Fe—Ni alloys), Fe—Ni—Mo alloys, Fe—Ni—Mo—Cu alloys, Fe—Ni—Co alloys, Fe—Cr alloys, Fe—Cr—Al alloys, Fe—Ni—Cr alloys, Fe—Ni—Cr—Si alloys, silicon coppers (Fe—Cu—Si alloys), Fe—Si alloys, Fe—Si—B (—Cu—Nb) alloys, Fe—B—Si—Cr alloys, Fe—Si—Cr—Ni alloys, Fe—Si—Cr alloys, Fe—Si—Al—Ni—Cr alloys, Fe—Ni—Si—Co alloys, Fe—N alloys, Fe—C alloys, Fe—B alloys, Fe—P Alloys, ferrites (including a stainless steel ferrite, and further including soft ferrites such as a Mn—Mg-based ferrite, a Mn—Zn-based ferrite, a Ni—Zn-based ferrite, a Ni—Zn—Cu-based ferrite, a Cu—Zn-based ferrite, and a Cu—Mg—Zn-based ferrite), permendurs (Fe—Co alloys), Fe—Co—V alloys, and Fe group amorphous alloys.

Examples of the Co-based alloy as an exemplary alloy body include Co—Ta—Zr, and cobalt (Co) group amorphous alloys.

Examples of the Ni-based alloy as an exemplary alloy body include Ni—Cr alloys.

The shape of the magnetic particles is not especially limited. Examples thereof include anisotropic shapes such as an approximately flat shape (board shape), an approximately aciculate shape (including an approximate spindle (American football) shape), and isotropic shapes such as an approximately spherical shape, an approximately granular shape, and an approximately massive shape.

The lower limit of the average value of maximum lengths of the magnetic particles is, for example, 0.1 μm, preferably 0.5 μm. The upper limit thereof is, for example, 200 μm, preferably 150 μm. The average value of maximum lengths of the magnetic particles is calculated as the median particle size of the magnetic particles.

The volume ratio (filling rate) of the magnetic particles in the magnetic composition is, for example, 10% by volume or more, preferably 20% by volume and, for example, 90% by volume or less, preferably 80% by volume.

Examples of the binder include thermoplastic components such as acrylic resin, and thermosetting components such as an epoxy resin composition. Examples of the acrylic resin include carboxyl group-containing acrylic acid ester copolymers. The epoxy resin composition contains, for example, an epoxy resin (such as cresol novolak epoxy resin) as a main agent, a curing agent for epoxy resin (such as phenol resin), and a curing accelerator for epoxy resin (such as an imidazole compound).

As the binder, the thermoplastic component and the thermosetting component can be used singly or in combination. Preferably, the thermoplastic component and the thermosetting component are used in combination.

The detailed formula of the above-described magnetic composition is described, for example, in Japanese Unexamined Patent Publication No. 2014-165363.

The type, shape, size, and volume ratio of the magnetic particles in the magnetic composition are appropriately changed so that the relative permeability of each of the second magnetic layer 5 and the third magnetic layer 6 is higher than the relative permeability of the first magnetic layer 4.

As examples of the shape of the magnetic particles, the material of the first magnetic layer 4 contains magnetic particles having an approximately spherical shape, and the materials of both of the second magnetic layer 5 and third magnetic layer 6 contain magnetic particles having an approximately flat shape (for example, as Example 1 to Example 4 described below). Alternatively, the materials of all of the first magnetic layer 4, the second magnetic layer 5, and the third magnetic layer 6 contain magnetic particles having an approximately spherical shape (for example, as Example 5 to Example 8 described below).

The suppression portion 7 is configured to suppress the magnetic coupling between the first wire 2 and second wire 3. When being projected in the thickness direction, the suppression portion 7 is located between the first wire 2 and second wire 3. In detail, when being projected in the thickness direction, the suppression portion 7 does not overlap the first wire 2 and second wire 3. When being projected in the thickness direction, the suppression portion 7 is located between a first point 51 the closest to the second wire 3 on the outer peripheral surface 17 of the first wire 2 and a second point 52 the closest to the first wire 2 on the outer peripheral surface 17 of the second wire 3.

The suppression portion 7 includes a slit 21 as an exemplary first suppression portion, and a second slit 22 as an exemplary second suppression portion. In the embodiment, preferably, the suppression portion 7 includes only the slit 21 and the second slit 22.

The slit 21 is located between the first surface 11 and the third surface 13. In detail, the suppression portion 7 is formed across the whole of the second magnetic layer 5 in the thickness direction. Specifically, the slit 21 penetrates the second magnetic layer 5 in the thickness direction. Although penetrating the second magnetic layer 5, the slit 21 neither penetrates nor chips the first magnetic layer 4. The slit 21 faces the first surface 11. In other words, the slit 21 exposes (the concave portion 32 of) the corresponding first surface 11. The slit 21 is exposed from the third surface 13. In other words, the slit 21 is open toward the one side in the thickness direction. The slit 21 is defined by the concave portion 32 of the first surface 11 of the first magnetic layer 4 and two internal surfaces 23 of the second magnetic layer 5 exposing the concave portion 32. The two internal surfaces 23 keep the same interval therebetween in the thickness direction, and are specifically parallel to each other.

A length L2 of the slit 21 in the thickness direction is larger than a length L3 of the slit 21 in the adjacent-direction. A ratio (L2/L3) of the thickness-direction length L2 of the slit 21 to the adjacent-direction length L3 of the slit 21 exceeds 1. Specifically, the lower limit of the ratio (L2/L3) is, for example, 1.5, preferably 3, more preferably 5, even more preferably 10, and the upper limit thereof is, for example, 1,000. When the ratio (L2/L3) is the above-described lower limit or more, the crosstalk between the first wire 2 and second wire 3 can efficiently be suppressed.

The upper limit of a ratio (L3/L) of the adjacent-direction length L3 of the slit 21 to the interval L between the adjacent first wire 2 and second wire 3 is, for example, 0.95, preferably 0.9, and the lower limit thereof is, for example, 0.0001.

Specifically, the upper limit of the adjacent-direction length L3 of the slit 21 is, for example, 1,000 μm, preferably 700 μm, preferably 500 μm, more preferably 300 μm, and the lower limit thereof is, for example, 5 μm.

The second slit 22 is located between the second surface 12 and the fourth surface 14. In detail, the suppression portion 7 is formed across the whole of the third magnetic layer 6 in the thickness direction. The second slit 22 is formed in the third magnetic layer 6. Specifically, the second slit 22 penetrates the third magnetic layer 6 in the thickness direction. Although penetrating the third magnetic layer 6, the second slit 22 neither penetrates nor chips the first magnetic layer 4. The second slit 22 faces the second surface 12. In other words, the second slit 22 exposes (the second concave portion 34 of) the corresponding third surface 13. The second slit 22 is exposed from the fourth surface 14. In other words, the second slit 22 is open toward the other side in the thickness direction. The second slit 22 is defined by the second concave portion 34 of the second surface 12, and two second internal surfaces 24 of the third magnetic layer 6 exposing the second concave portion 34. The second internal surfaces 24 keep the same interval therebetween in the thickness direction, and are specifically parallel to each other.

A length L4 of the second slit 22 in the thickness direction is larger than a length L5 of the second slit 22 in the adjacent direction. The lower limit of a ratio (L4/L5) of the thickness-direction length L4 of the second slit 22 to the adjacent-direction length L5 of the second slit 22 exceeds 1. Specifically, the ratio (L4/L5) is, for example, 1.5, preferably 3, more preferably 5, even more preferably 10, and the upper limit thereof is, for example, 1,000. When the ratio (L4/L5) is the above-described lower limit or more, the crosstalk between the first wire 2 and second wire 3 can efficiently be suppressed.

The lower limit of a ratio (L5/L) of the adjacent-direction length L5 of the second slit 22 to the interval L between the adjacent first wire 2 and second wire 3 is, for example, 0.95, preferably 0.9, and the upper limit thereof is, for example, 0.0001.

Specifically, the adjacent-direction length L5 of the second slit 22 is the same as the above-described adjacent-direction length L3 of the slit 21.

The thickness of the inductor 1 is the length between the third surface 13 and the fourth surface 14. Specifically, the lower limit of the thickness of the inductor 1 is, for example, 30 μm, preferably 50 μm, and the upper limit thereof is, for example, 10,000 μm, preferably 2,000 μm.

Figures 2A, 2B, 2C:
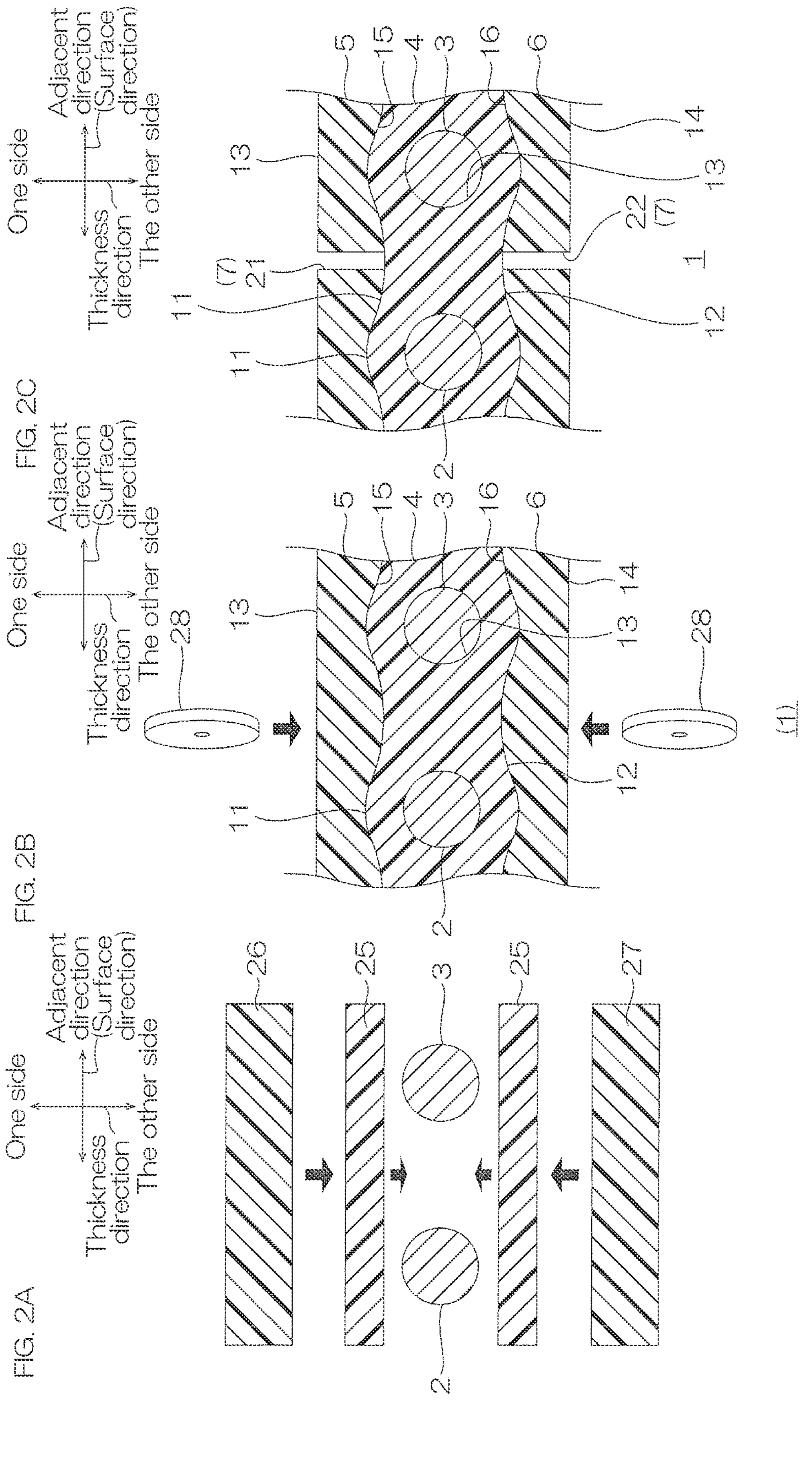
FIG. 2A to FIG. 2C are views for describing a method for producing the inductor illustrated in FIG. 1.

To obtain the inductor 1, as illustrated in FIG. 2A, a first wire 2 and a second wire 3, two first magnetic sheets 25, one second magnetic sheet 26, and one third magnetic sheet 27 are prepared first.

The two first magnetic sheets 25 are precursor sheets to form the first magnetic layer 4. The second magnetic sheet 26 is a precursor sheet to form the second magnetic layer 5. The third magnetic sheet 27 is a precursor sheet to form the third magnetic layer 6. The precursor sheets are, for example, in B stage.

The second magnetic sheet 26, one of the first magnetic sheets 25, the first wire 2 and second wire 3, the other of the first magnetic sheets 25, and the third magnetic sheet 27 are sequentially disposed toward the other side in the thickness direction.

Subsequently, the disposed sheets are heat pressed in the thickness direction. The two first magnetic sheets 25 are deformed to embed the first wire 2 and second wire 3, and become the first magnetic layer 4. The second magnetic sheet 26 is deformed to follow the first surface 11, and becomes the second magnetic layer 5. The third magnetic sheet 27 is deformed to follow the second surface 12, and becomes the third magnetic layer 6. The above-described heat press brings the precursor sheets (the first magnetic sheet 25 to the third magnetic sheet 27) into C stage. In this manner, an inductor 1 that does not include a suppression portion 7 and includes the first magnetic layer 4 to the third magnetic layer 6 is produced.

As illustrated in FIG. 2C, thereafter, the slit 21 and the second slit 22 are formed in the second magnetic layer 5 and the third magnetic layer 6 of the inductor 1, respectively. For example, a cutting device is used to form the slit 21 and the second slit 22.

Examples of the cutting device include a contact cutting device, such as a dicing machine, that physically contacts the second magnetic layer 5 and/or the third magnetic layer 6, and a non-contact cutting device, such as a laser device, that does not physically contact the second magnetic layer 5 and/or the third magnetic layer 6.

The dicing machine as an exemplary contact cutting device includes a supporting stand (not illustrated); a dicing saw 28 facing the supporting stand, holding an interval therebetween; and a moving device (not illustrated) that moves the dicing saw 28. Examples of the dicing saw 28 include a dicing blade having a disk shape.

In this manner, the inductor 1 including the suppression portion 7 having the slit 21 and the second slit 22 is produced.

Operations and Effects of Embodiment

In the inductor 1, the relative permeability of each of the second magnetic layer 5 and the third magnetic layer 6 is higher than the relative permeability of the first magnetic layer 4, and the suppression portion 7 includes the slit 21 located between the first surface 11 and the third surface 13. Thus, the inductor 1 has excellent superimposed DC current characteristics, and can suppress the crosstalk between the first wire 2 and second wire 3 while suppressing the reduction in the inductance.

The inductor 1 includes the slit 21 facing the first surface 11. Thus, the crosstalk between the first wire 2 and second wire 3 can efficiently be suppressed.

In the inductor 1, the slit 21 is exposed from the third surface 13. Thus, the slit 21 can easily be formed.

In the inductor 1, the thickness-direction length L2 of the slit 21 is larger than the adjacent-direction length L3 of the slit 21. Thus, the crosstalk between the first wire 2 and second wire 3 can efficiently be suppressed while the reduction in the reduction in the inductance can be suppressed as much as possible.

In the inductor 1, the first suppression portion is the slit 21. This simplifies the structure and allows air having the lowest relative permeability of 1 to exist in the slit 21. Thus, the slit 21 can surely suppress the crosstalk between the first wire 2 and second wire 3.

The inductor 1 includes the suppression portion 7 further including the second slit 22 located between the second surface 12 and the fourth surface 14. Thus, the crosstalk between the first wire 2 and second wire 3 can be suppressed while the reduction in the inductance can be suppressed.

The inductor 1 includes the second slit 22 facing the second surface 12. Thus, the crosstalk between the first wire 2 and second wire 3 can efficiently be suppressed.

The inductor 1 includes the second slit 22 exposed from the fourth surface 14. Thus, the second slit 22 can easily be formed.

In the inductor 1, the thickness-direction length L4 of the second slit 22 is larger than the adjacent-direction length L5 of the second slit 22. Thus, the crosstalk between the first wire 2 and second wire 3 can efficiently be suppressed while the reduction in the inductance can be suppressed as much as possible.

In the inductor 1, the second suppression portion is the second slit 22. This simplifies the structure and allows air having the lowest relative permeability of 1 to exist in the slit 21. Thus, the slit 21 can surely suppress the crosstalk between the first wire 2 and second wire 3.

<Variations>

In the following variations, the same members and steps as in the embodiment will be given the same numerical references and the detailed description will be omitted. Further, the variations can have the same operations and effects as those of the embodiment unless especially described otherwise. Furthermore, the embodiment and variations can appropriately be combined.

Figure 3:
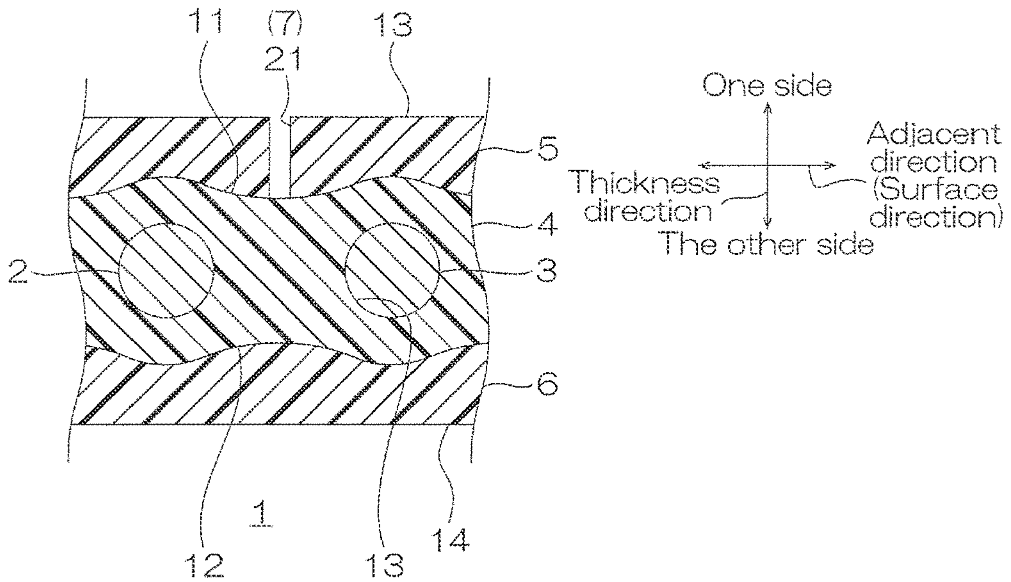
FIG. 3 is a frontal cross-sectional view of a variation of the inductor illustrated in FIG. 1 (a mode without including the second slit).

As illustrated in FIG. 3, in the inductor 1, a suppression portion 7 does not include a second slit 22 (see FIG. 1) and includes only a slit 21. To efficiently suppress the crosstalk between the first wire 2 and second wire 3, preferably, the suppression portion 7 includes the slit 21 and the second slit 22.

Figure 4:
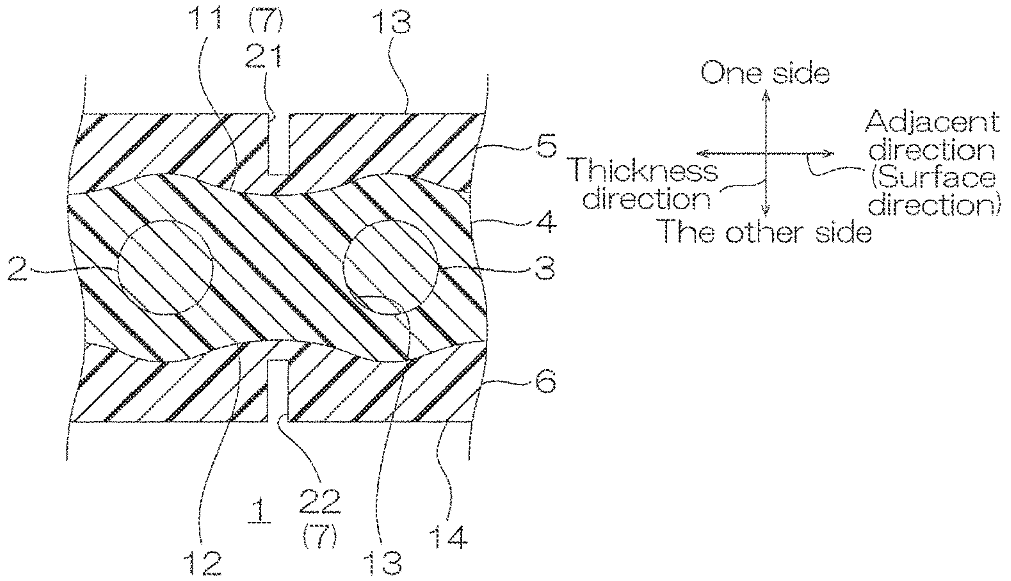
FIG. 4 is a frontal cross-sectional view of a variation of the inductor illustrated in FIG. 1 (a mode in which the slit does not face the first surface, and the second slit does not face the second surface).

As illustrated in FIG. 4, a slit 21 does not face a first surface 11, and is separated from the first surface 11 by an interval in the thickness direction. A second slit 22 does not face a second surface 12, and is separated from the second surface 12 by an interval in the thickness direction. Preferably, as the embodiment, the slit 21 faces the first surface 11 and the second slit 22 faces the second surface 12.

Figure 5:
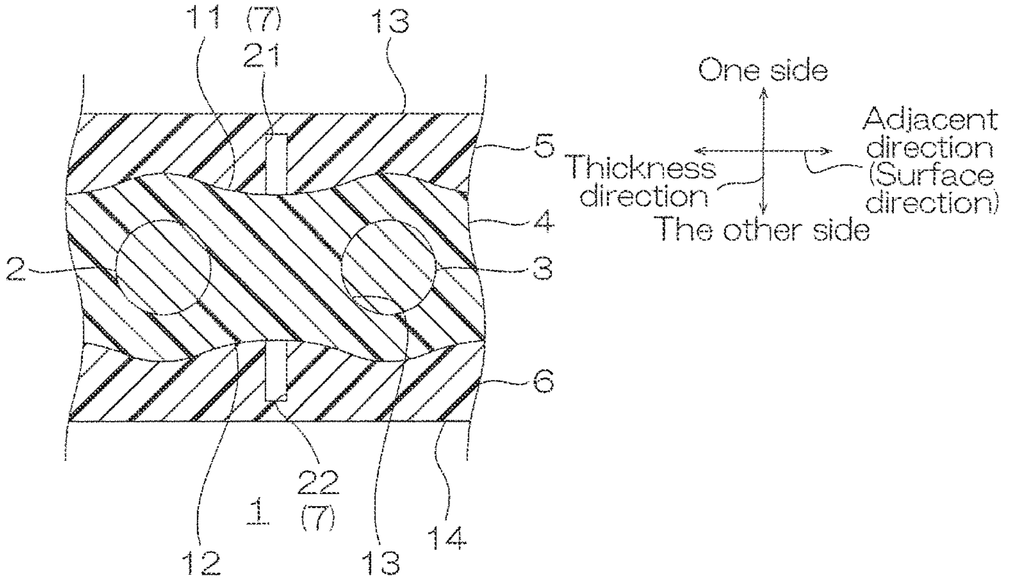
FIG. 5 is a frontal cross-sectional view of a variation of the inductor illustrated in FIG. 1 (a mode in which the slit is not exposed from the third surface, and the second slit is not exposed from the fourth surface).

As illustrated in FIG. 5, a slit 21 is not exposed from a third surface 13, and one edge in the thickness direction of the slit 21 is blocked by a second magnetic layer 5. A second slit 22 is not exposed from a fourth surface 14, and the other edge in the thickness direction of the second slit 22 is blocked by a third magnetic layer 6. Preferably, as the embodiment, the slit 21 is exposed from the third surface 13, and the second slit 22 is exposed from the fourth surface 14.

Figure 6:
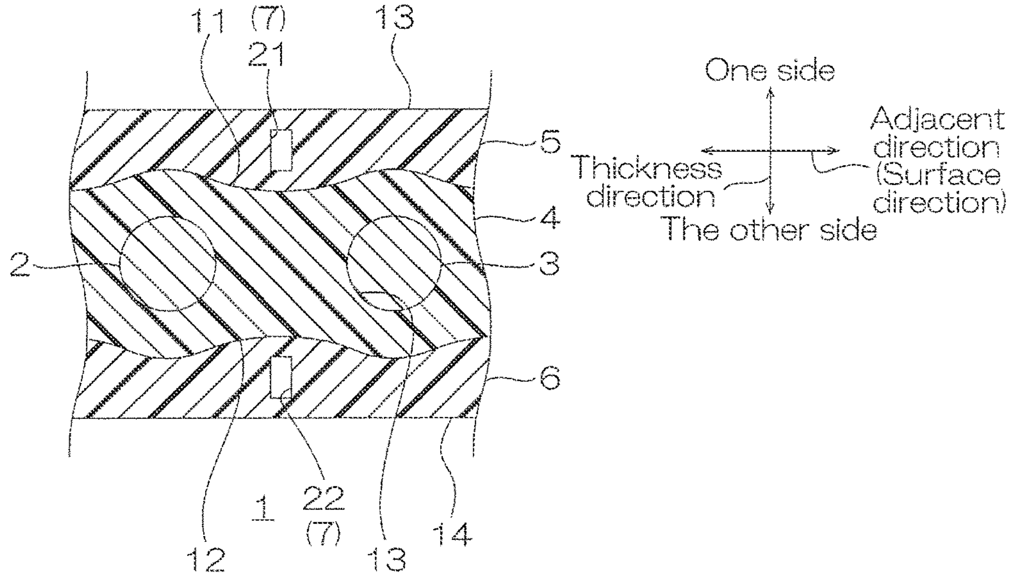
FIG. 6 is a frontal cross-sectional view of a variation of the inductor illustrated in FIG. 1 (a mode in which the slit does not face the first surface and is not exposed from the third surface, and the second slit does not face the second surface, and is not exposed from the fourth surface).

As illustrated in FIG. 6, a slit 21 does not face a first surface 11 and is not exposed from a third surface 13. The slit 21 is located at an intermediate portion between the first surface 11 and the third surface 13 in the thickness direction. A second slit 22 does not face a second surface 12, and is not exposed from a fourth surface 14. The second slit 22 is located at an intermediate portion between the second surface 12 and the fourth surface 14 in the thickness direction.

Figure 7:
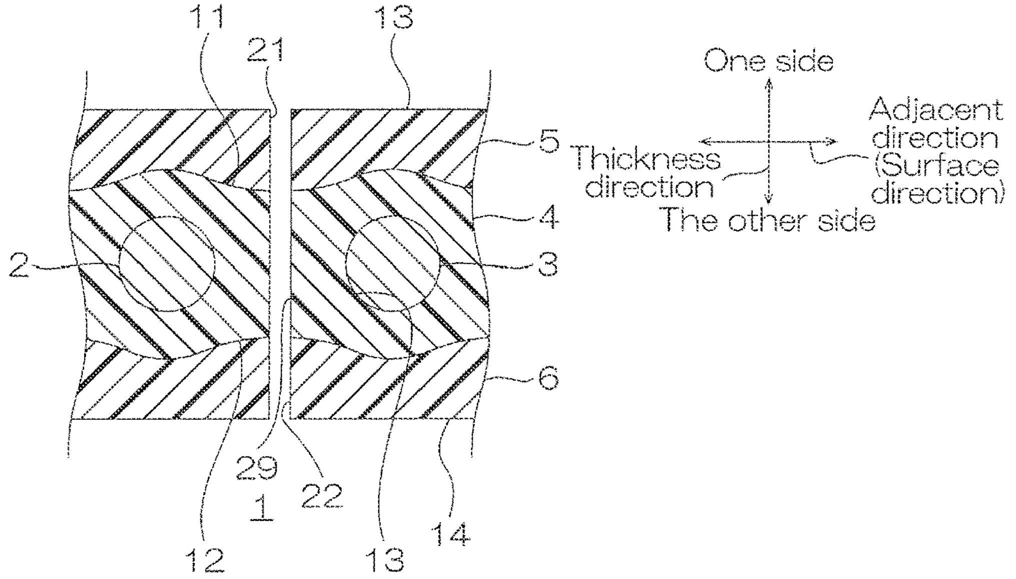
FIG. 7 is a frontal cross-sectional view of a variation of the inductor illustrated in FIG. 1 (a mode in which the slit and second slit are communicated with each other).

As illustrated in FIG. 7, a slit 21 and a second slit 22 are communicated with each other via an intermediate slit 29. The intermediate slit 29 is located between a first surface 11 and a second surface 12. The intermediate slit 29 penetrates a first magnetic layer 4 in the thickness direction. Preferably, as the embodiment, an intermediate slit 29 is not formed in the inductor 1.

Figure 8:
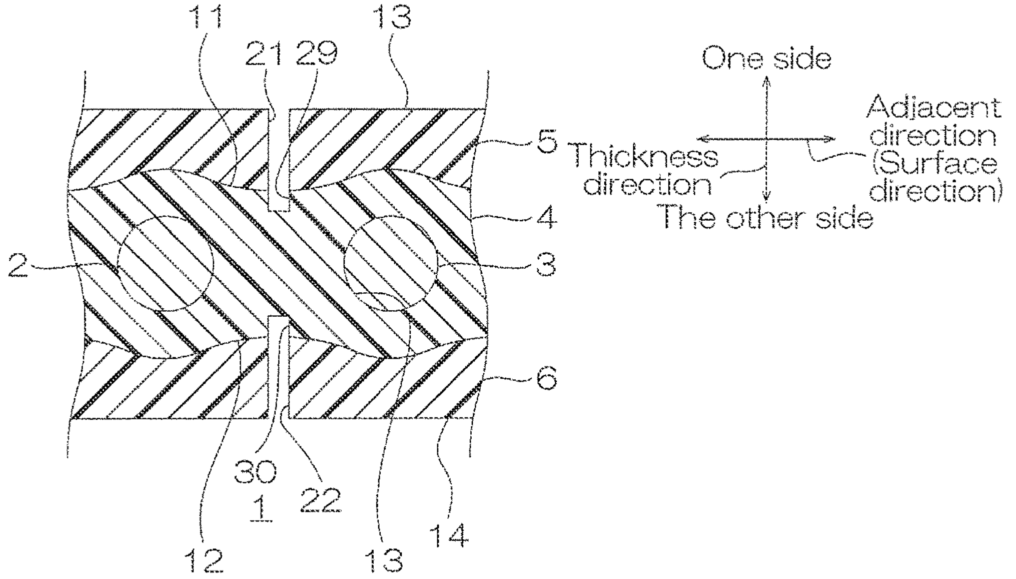
FIG. 8 is a frontal cross-sectional view of a variation of the inductor illustrated in FIG. 1 (a mode in which the slit is communicated with an intermediate slit, and the second slit is communicated with a second intermediate slit).

As illustrated in FIG. 8, a slit 21 is communicated with an intermediate slit 29. The intermediate slit 29 is chipped from a first surface 11 of a first magnetic layer 4 toward an intermediate portion in the thickness direction. A second slit 22 is communicated with a second intermediate slit 30. The second intermediate slit 30 is chipped from a second surface 12 of the first magnetic layer 4 toward the intermediate portion in the thickness direction. The second intermediate slit 30 faces the intermediate slit 29, holding an interval therebetween in the thickness direction.

Figure 9:
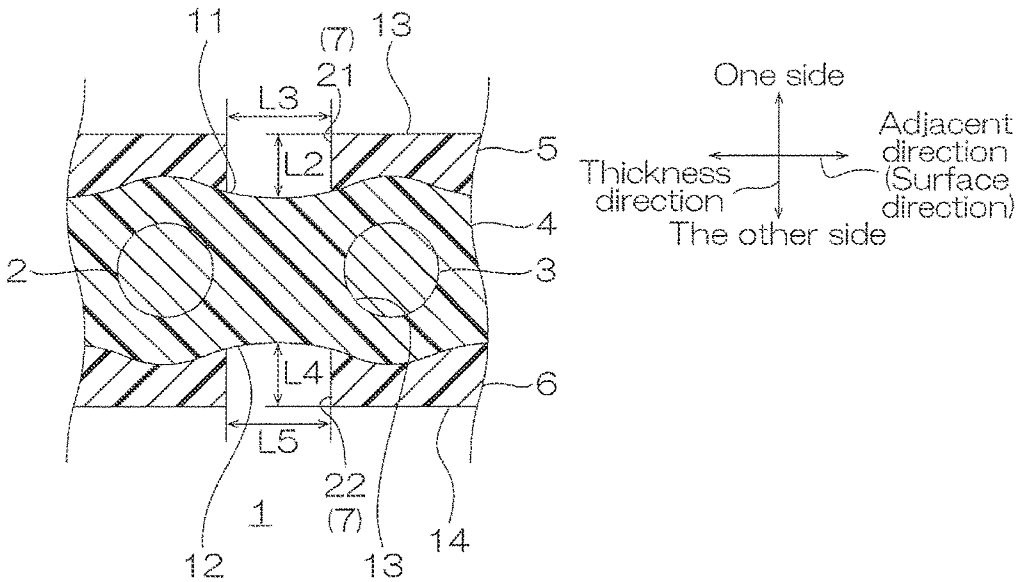
FIG. 9 is a frontal cross-sectional view of a variation of the inductor illustrated in FIG. 1 (a mode in which a thickness-direction length L2 of the slit is smaller than an adjacent-direction length L3 of the slit, a thickness-direction length L4 of the second slit is smaller than an adjacent-direction length L5 of the second slit).

As illustrated in FIG. 9, a thickness-direction length L2 of a slit 21 is smaller than an adjacent-direction length L3 of a slit 21. Although not illustrated, the length L2 and L3 of the slit 21 may be the same. The upper limit of the ratio (L2/L3) of the thickness-direction length L2 of the slit 21 to the adjacent-direction length L3 of the slit 21 is, for example, 1 or less, preferably less than 1, and the lower limit of the ratio (L2/L3) is 0.01, preferably 0.05, more preferably 0.1, even more preferably 0.2.

A thickness-direction length L4 of a second slit 22 is smaller than an adjacent-direction length L5 of a second slit 22. Although not illustrated, the length L4 and L5 of the second slit 22 may be the same. The upper limit of the ratio (L4/L5) of the thickness-direction length L4 of the second slit 22 to the adjacent-direction length L5 of the second slit 22 is, for example, 1 or less, preferably less than 1, and the lower limit of the ratio (L2/L3) is, 0.01, preferably 0.05, more preferably 0.1, even more preferably 0.2.

Figure 10:
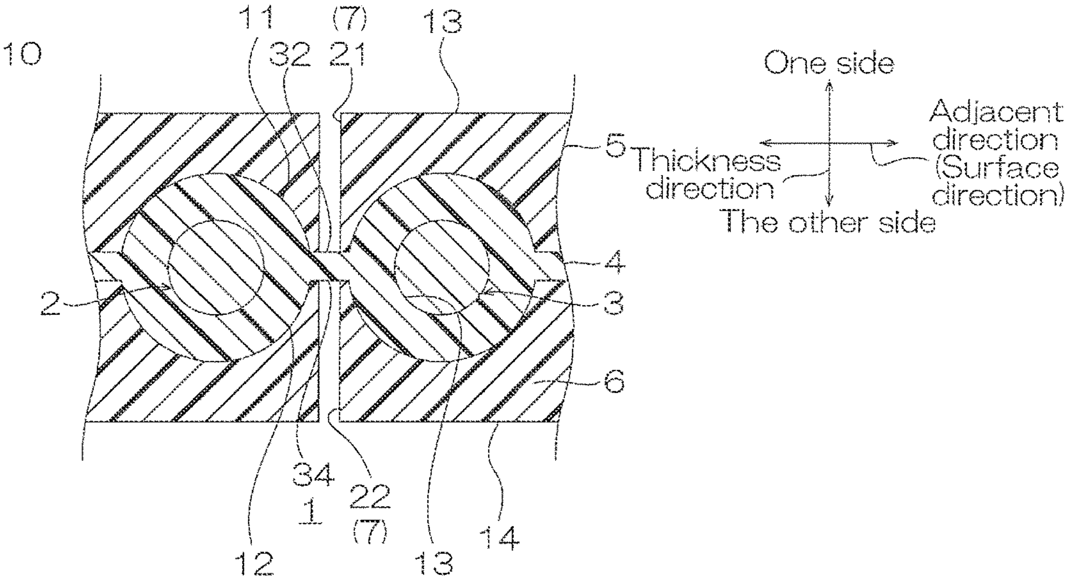
FIG. 10 is a frontal cross-sectional view of a variation of the inductor illustrated in FIG. 1 (a mode in which a concave portion and a second concave portion overlap the first wire and second wire when being projected in the adjacent direction).

As illustrated in FIG. 10, when being projected in the adjacent direction, a concave portion 32 of a first surface 11 overlaps a first wire 2 and a second wire 3. When being projected in the adjacent direction, a second concave portion 34 of a second surface 12 overlaps the first wire 2 and second wire 3.

Figure 11:
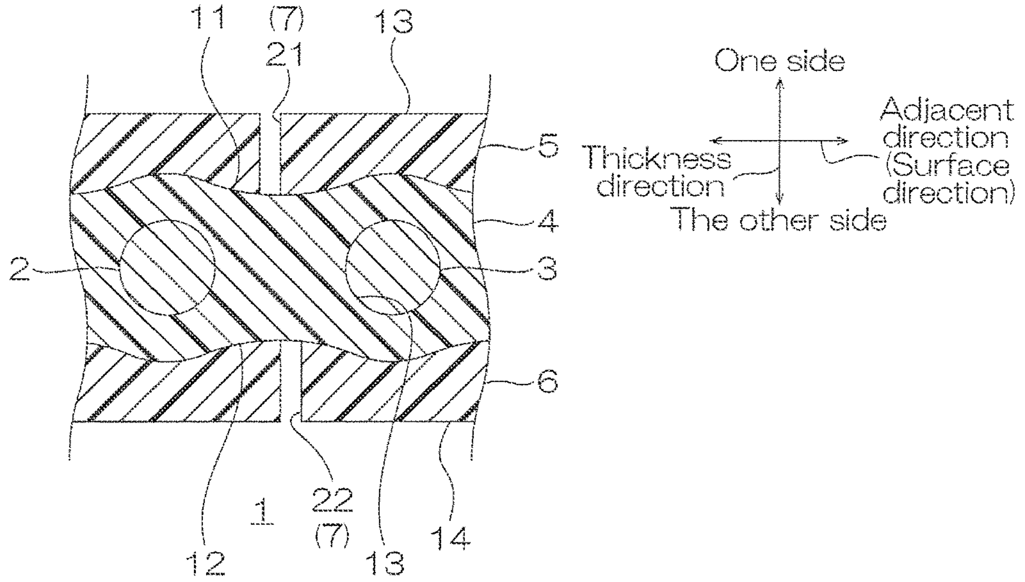
FIG. 11 is a frontal cross-sectional view of a variation of the inductor illustrated in FIG. 1 (a mode in which the slit and the second slit are displaced from each other).

As illustrated in FIG. 11, when being projected in the thickness direction, a slit 21 and a second slit 22 are displaced (offset) from each other in the adjacent direction.

Figure 12:
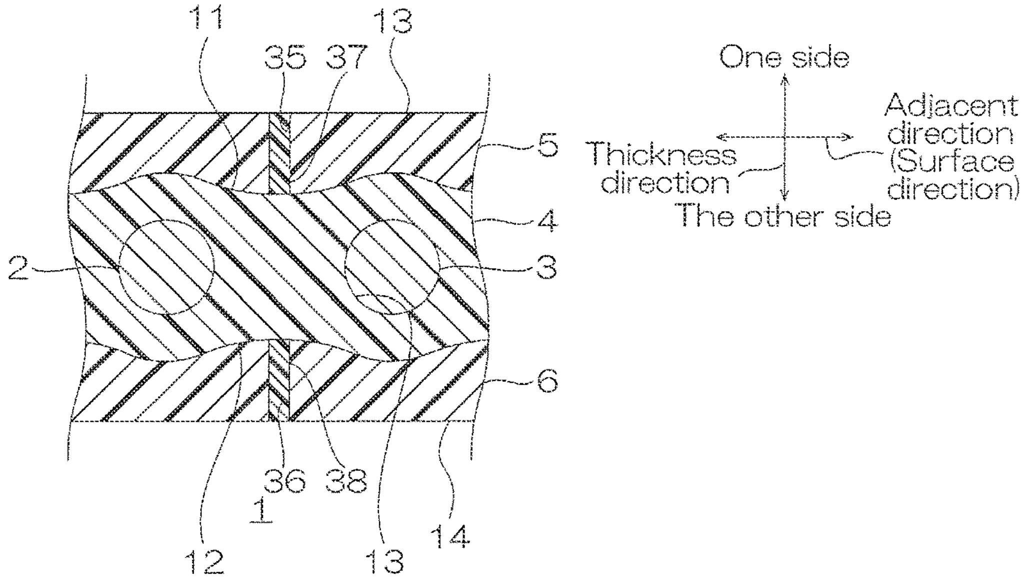
FIG. 12 is a frontal cross-sectional view of a variation of the inductor illustrated in FIG. 1 (a mode in which the first suppression portion is a first filling portion, and the second suppression portion is a second filling portion).

As illustrated in FIG. 12, a void 35 working as the slit 21 is filled with a first filling portion 37. A void 35 working as the second slit 22 is filled with a second filling portion 38.

Figure 13:
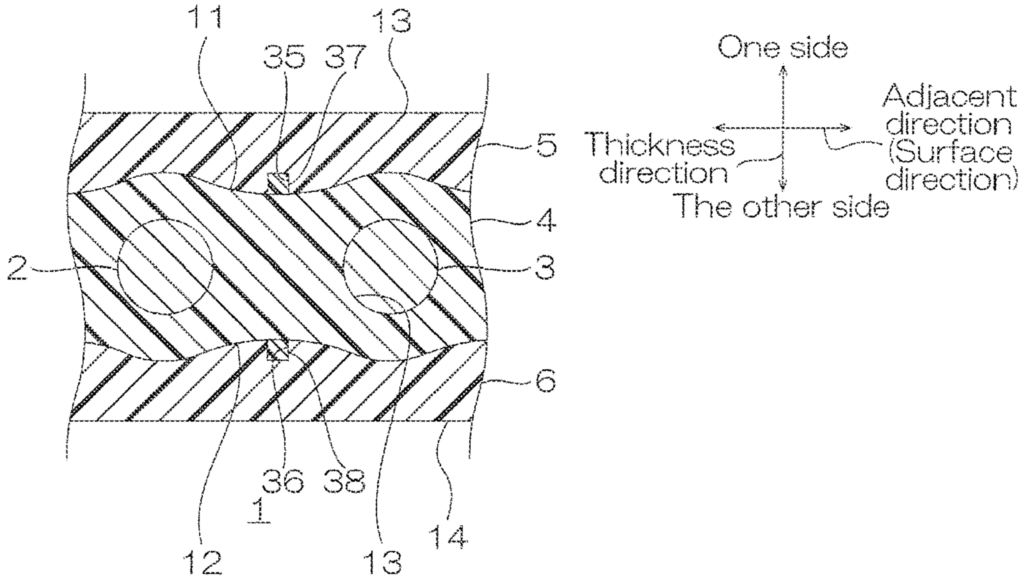
FIG. 13 is a frontal cross-sectional view of a variation of the inductor illustrated in FIG. 12 (a mode in which the first filling portion is embedded in a second magnetic layer, and the second filling portion is embedded in a third magnetic layer).

As illustrated in FIG. 13, a first filling portion 37 is not exposed from a third surface 13 and is embedded in a second magnetic layer 5. A second filling portion 38 is not exposed from a fourth surface 14, and is embedded in a third magnetic layer 6. Each of the first filling portion 37 and the second filling portion 38 has an approximately rectangular shape in the cross-sectional view. The relative permeability of each of the first filling portion 37 and the second filling portion 38 is lower than the relative permeability of the first magnetic layer 4.

Examples of the material of each of the first filling portion 37 and the second filling portion 38 include a non-magnetic composition that does not contain magnetic particles and contains a binder. Examples of the binder are cited in the above description of the magnetic composition.

To obtain the inductor 1, with reference to FIG. 2A, the two first magnetic sheets 25, and the first wire 2 and second wire 3 are prepared and then heat pressed. When the first magnetic sheet 25 contains a thermosetting component, the heat press brings the first magnetic sheets 25 into C stage. In this manner, the first magnetic layer 4 is formed. Subsequently, the first filling portion 37 and second filling portion 38 in a solid state at room temperature are disposed on the concave portion 32 and the second concave portion 34 of the second surface 12, respectively. The portions are held between the second magnetic sheet 26 and the third magnetic sheet 27 and heat pressed. In this manner, the second magnetic layer 5 embedding the first filling portion 37 and the third magnetic layer 6 embedding the second filling portion 38 are formed.

Figure 14:
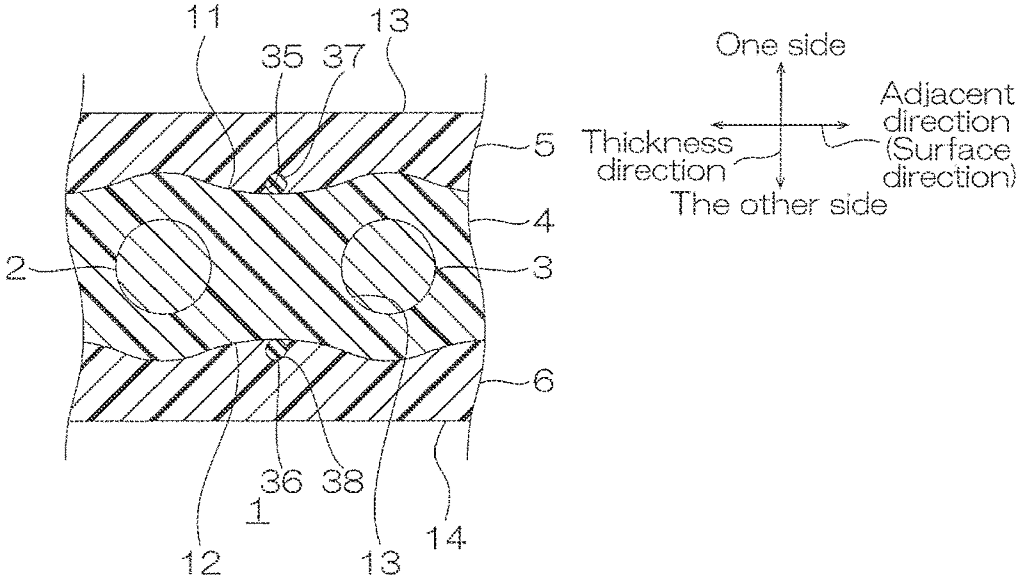
FIG. 14 is a frontal cross-sectional view of a variation of the inductor illustrated in FIG. 13 (a mode in which each of the first filling portion and the second filling portion has an approximately circular shape in the cross-sectional view).

As illustrated in FIG. 14, each of the first filling portion 37 and the second filling portion 38 has an approximately circular shape in the cross-sectional view.

Figure 15:
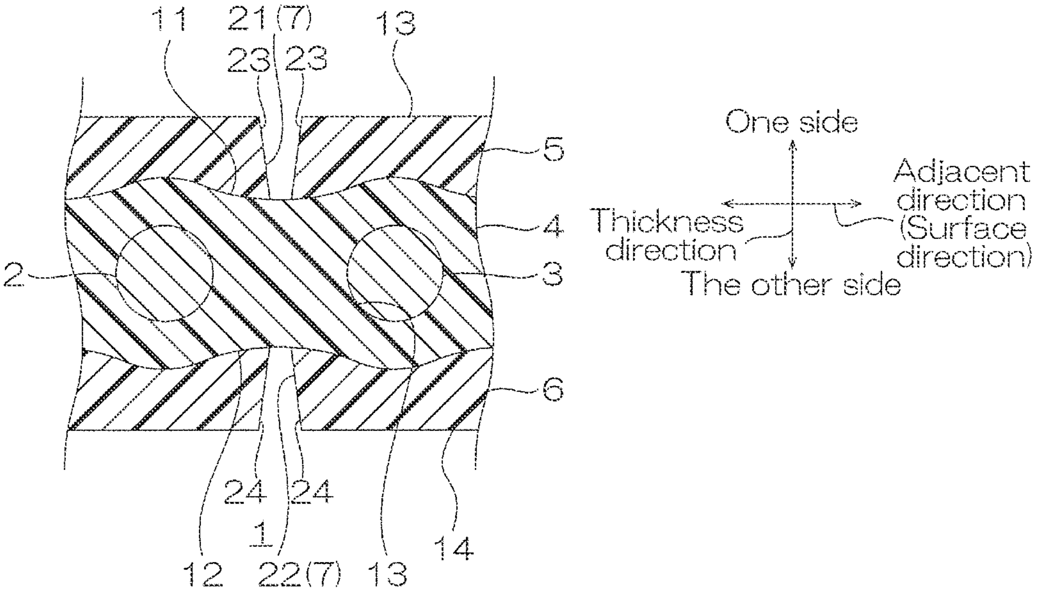
FIG. 15 is a frontal cross-sectional view of a variation of the inductor illustrated in FIG. 1 (a mode in which each of the internal surface and the second internal surface has a tapered shape).

As illustrated in FIG. 15, the two internal surfaces 23 defining the slit 21 form a tapered shape where the facing length therebetween gradually decreases from the third surface 13 toward the first surface 11. The two second internal surfaces 24 defining the second slit 22 form a tapered shape where the facing length therebetween gradually decreases from the fourth surface 14 toward the second surface 12.

The first magnetic sheet 25 can consist of a plurality of sheets depending on the desired thickness of the first magnetic layer 4. The second magnetic sheet 26 can consist of a plurality of sheets depending on the desired thickness of the second magnetic layer 5. The third magnetic sheet 27 can consist of a plurality of sheets depending on the desired thickness of the third magnetic layer 6.

Although not illustrated, the shapes of the first wire 2 and the third wire 3 are not especially limited, and may be, for example, a rectangular shape in the cross-sectional view.

Although not illustrated, a second magnetic layer 5 in which a slit 21 is formed in advance can be adhered to a first surface 11 of a first magnetic layer 4. A third magnetic layer 6 in which a second slit 22 is formed in advance can be adhered to a second surface 12 of the first magnetic layer 4.

Figure 16B:
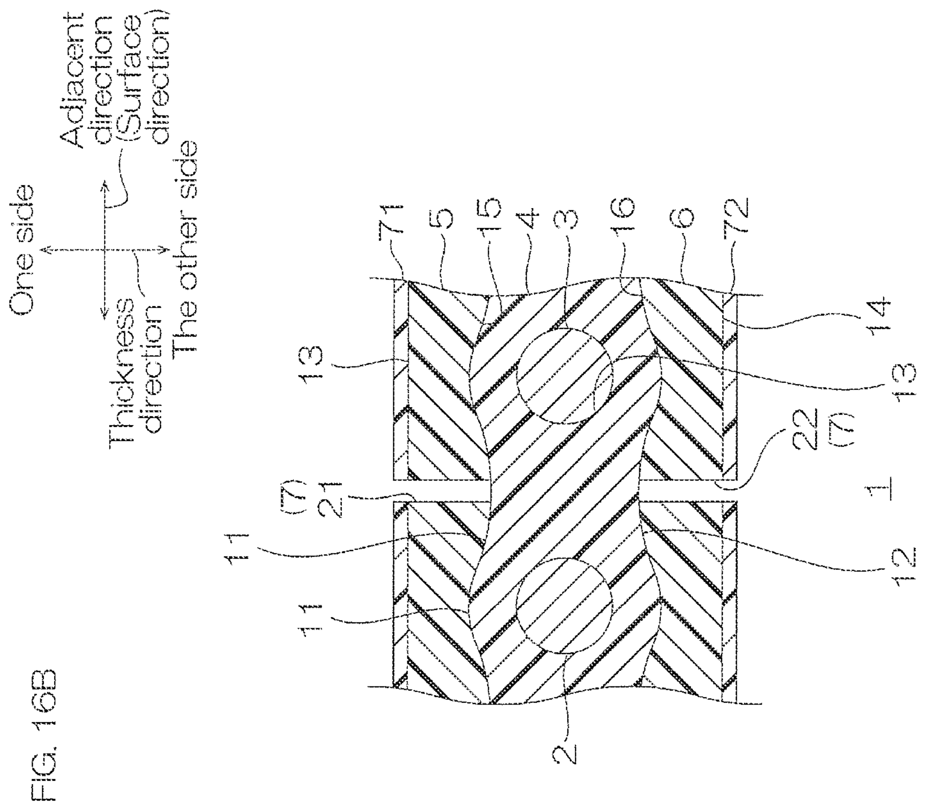
FIG. 16A and FIG. 16B are views for describing a method for producing the variations of the inductor (including a processing mode).

As illustrated in FIG. 16B, the inductor 1 can further include a processing stabilization layer 71 and a processing stabilization layer 72.

The processing stabilization layer 71 and the processing stabilization layer 72 improve the surface processability of the third surface 13 of the second magnetic layer 5 and the surface processability of the fourth surface 14 of the third magnetic layer 6, respectively.

The processing stabilization layer 71 is disposed on the third surface 13 of the second magnetic layer 5. The slit 21 is formed also in the processing stabilization layer 71. The processing stabilization layer 71 is in contact with the whole of the third surface 13.

The processing stabilization layer 71 includes a cured product of a thermosetting resin composition. In other words, the material of the processing stabilization layer 71 includes a thermosetting resin composition.

The thermosetting resin composition contains thermosetting resin as an essential component and particles as an optional component.

The thermosetting resin includes a main agent, a curing agent, and a curing accelerator.

Examples of the main agent include epoxy resin and silicone resin. Preferably, an epoxy resin is used. Examples of the epoxy resin include bifunctional epoxy resins such as bisphenol A epoxy resin, bisphenol F epoxy resin, bisphenol S epoxy resin, modified bisphenol A epoxy resin, modified bisphenol F epoxy resin, modified bisphenol S epoxy resin and biphenyl epoxy resin; and trifunctional or more of multifunctional epoxy resins such as phenol novolak epoxy resin, cresol novolak epoxy resin, trishydroxyphenyl methane epoxy resin, tetraphenylol ethane epoxy resin, and dicyclopentadiene epoxy resin. These epoxy resins can be used alone or in combination of two or more. Preferably, a bifunctional epoxy resin, more preferably, a bisphenol A epoxy resin is used.

The lower limit of the epoxy equivalent of the epoxy resin is, for example, 10 g/eq., and the upper limit thereof is, for example, 1,000 g/eq.

Examples of the curing agent include phenol resins, and isocyanate resins when the main agent is an epoxy resin. Examples of the phenol resin include multifunctional phenol resins such as phenol novolak resin, cresol novolak resin, phenol aralkyl resin, phenol biphenylene resin, dicyclopentadiene phenol resin, and resol resin. These can be used alone or in combination of two or more. Preferred examples of the phenol resin include phenol novolak resin, and phenol biphenylene resin. When the main agent is epoxy resin and the curing agent is phenol resin, the lower limit of the total amount of the hydroxyl group in the phenol resin with respect to 1 equivalent of the epoxy group in the epoxy resin is, for example, 0.7 equivalent, preferably 0.9 equivalent, and the upper limit thereof is, for example, 1.5 equivalent, preferably 1.2 equivalent. Specifically, the lower limit of parts by mass of the curing agent is, for example, 1 part by mass, and, for example, 50 parts by mass with respect to 100 parts by mass of the main agent.

The curing accelerator is a catalyst (thermosetting catalyst) (preferably an epoxy resin curing accelerator) that accelerates the curing of the main agent, and examples thereof include organic phosphorus compounds, and imidazole compounds such as 2-phenyl-4-methyl-5-hydroxymethylimidazole (2P4MHZ). The lower limit of parts by mass of the curing accelerator is, for example, 0.05 parts by mass with respect to the main agent 100 parts by mass, and the upper limit thereof is, for example, 5 parts by mass with respect to the main agent 100 parts by mass.

The particles are an optional component in the thermosetting resin composition. The particles are dispersed in the thermosetting resin. The particles are at least one selected from the group consisting of the first particles and the second particles.

The first particles have an approximately spherical shape. The lower limit of the median size of the first particles is, for example, 1 μm, preferably 5 μm, and the upper limit of the median size of the first particles is, for example, 250 μm, preferably 200 μm. The median size of the first particles is obtained by a laser diffraction particle size distribution analyzer. Alternatively, the median size of the first particles can be obtained, for example, by a thresholding process by the observation of a cross section of the laminated sheet 1.

The material of the first particles is not especially limited. Examples of the material of the first particles include metals, inorganic compounds, and organic compounds. Preferred examples to increase the coefficient of thermal expansion include metals and inorganic compounds.

The metals are contained in the thermosetting resin composition when the processing stabilization layer 71 functions as an inductance improving layer. Examples of the metals include the magnetic bodies cited in the description of the magnetic layer 5. Preferably an organic iron compound including iron as the first metal element, more preferably carbonyl iron is used.

The inorganic compounds are contained in the thermosetting resin composition when the processing stabilization layer 71 functions as a thermal expansion coefficient suppressing layer. Examples thereof include inorganic fillers and specific examples include silica and alumina. Preferably, silica is used.

Specifically, as the first particles, preferably, spherical silica or spherical carbonyl iron is used.

The second particles have an approximately flat shape. The approximately flat shape includes an approximately board shape.

The lower limit of (the degree of) the flattening of the second particles is, for example, 8, preferably 15, and the upper limit thereof is, for example, 500, preferably 450. The flattening of the second particles is obtained by the same method as that of calculating the flattening of the magnetic particles in the above-described magnetic layer 5.

The lower limit of the median size of the second particles is, for example, 1 μm, preferably 5 μm, and the upper limit of the median size of the second particles is, for example, 250 μm, preferably 200 μm. The median size of the second particles is obtained by the same method as that of calculating the first particles.

The lower limit of the average thickness of the second particles is, for example, 0.1 μm, preferably 0.2 μm, and the upper limit thereof is, for example, 3.0 μm, preferably 2.5 μm.

The material of the second particles is an inorganic compound. Examples of the inorganic compound include thermally conductive compounds such as boron nitride. Accordingly, the inorganic compound is preferably contained in the thermosetting resin composition when the processing stabilization layer 71 functions as a thermal conductivity improving layer.

Specifically, preferable examples of the second particles include flat-shaped boron nitride.

One or both of the first particles and the second particles are contained in the thermosetting resin composition.

The lower limit of parts by mass of the particles (the first particles and/or the second particles) with respect to 100 parts by mass of the thermosetting resin is, for example, 10 parts by mass, preferably 50 parts by mass, and the upper limit thereof is, for example, 2,000 parts by mass, preferably 1,500 parts by mass. The lower limit of the ratio of the particles contained in the cured product is, for example, 10% by mass, and the upper limit thereof is, for example, 90% by mass. When both of the first particles and the second particles are contained in the thermosetting resin composition, the lower limit of parts by mass of the second particles to 100 parts by mass of the first particles is, for example, 30 parts by mass, and the upper limit thereof is, for example, 300 parts by mass.

Because the particles are an optional component in the thermosetting resin composition, the thermosetting resin composition may not contain the particles.

The lower limit of the thickness of the processing stabilization layer 71 is, for example, 1 μm, preferably 10 μm, and the upper limit thereof is, for example, 1,000 μm, preferably 100 μm. The lower limit of the ratio of the thickness of the processing stabilization layer 71 to the thickness of a laminated sheet 1 is, for example, 0.001, preferably 0.005, more preferably 0.01, and the upper limit thereof is, for example, 0.5, preferably 0.3, more preferably 0.1.

The material and dimensions of the second processing stabilization layer 72 are the same as those of the processing stabilization layer 71.

Figure 16A:
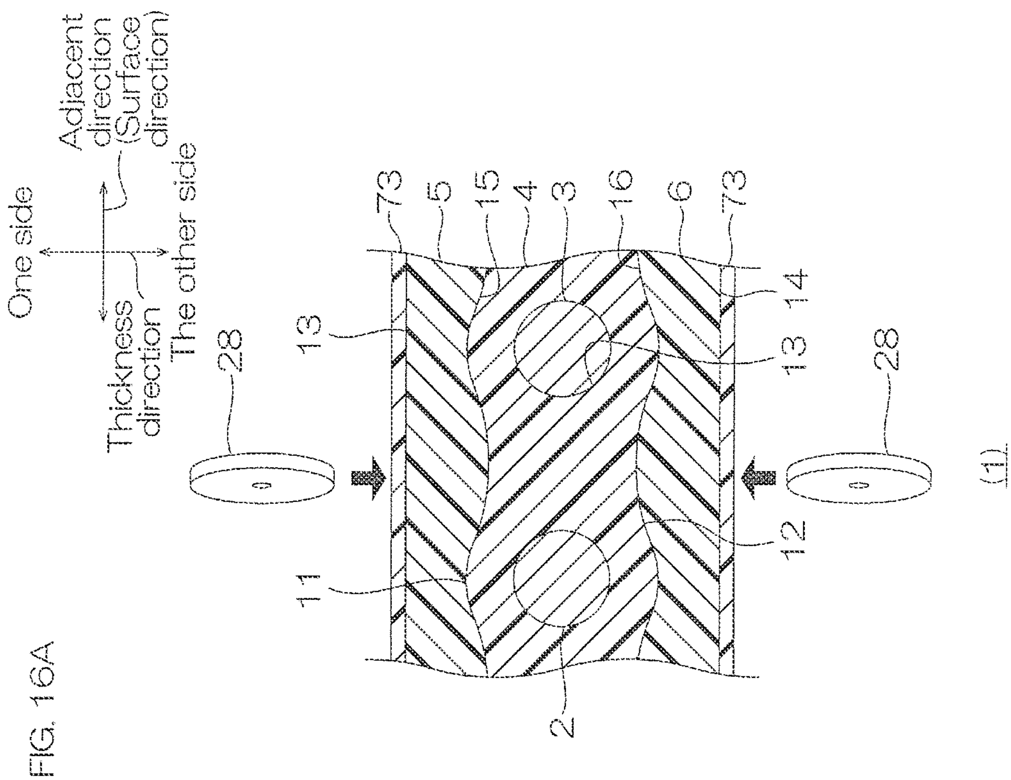

To produce an inductor 1 including the processing stabilization layer 71 and the second processing stabilization layer 72, as illustrated in FIG. 2B, an inductor 1 without including the suppression portion 7 is produced. Then, as illustrated in FIG. 16A, the two processing stabilization sheets 73 are disposed (laminated) on the third surface 13 and the fourth surface 14, respectively.

The processing stabilization sheets 73 are formed into a sheet shape from the materials of the processing stabilization layer 71 and the second processing stabilization layer 72, respectively. The processing stabilization sheets 73 preferably contain the thermosetting resin composition in B stage.

The above-described materials are prepared as a varnish by blending a solvent in the above-described thermosetting resin composition. Further, a thermoplastic resin can be blended in the materials.

Examples of the solvent include alcohol compounds such as methanol, ether compounds such as dimethyl ether, and ketone compounds such as methyl ethyl ketone, and cyclohexanone. The blending ratio of the solvent is adjusted so that the lower limit of the ratio by mass of the solid content of the blended varnish is, for example, 10% by mass, and the upper limit thereof is, for example, 95% by mass.

In this method, the varnish is applied and dried on a surface of a peeling sheet not illustrated to form the two processing stabilization sheets 73.

Subsequently, the two processing stabilization sheets 73 are pressed from both sides in the thickness direction. The two processing stabilization sheets 73 are adhered to the third surface 13 and the fourth surface 14, respectively.

Thereafter, the adhered sheets and surfaces are heated to bring the processing stabilization sheets 73 into C stage. In this manner, the slit 21 is formed in the processing stabilization layer 71 and the second magnetic layer 5. Meanwhile, the second slit 22 is formed in the second processing stabilization layer 72 and the third magnetic layer 6. In this manner, a laminated sheet 1 including the slit 21 and second slit 22 formed in the processing stabilization layer 71 and second magnetic layer 5 and the second processing stabilization layer 72 and third magnetic layer 6, respectively, is produced.

The inductor 1 of the variation includes the processing stabilization layer 71, and thus the second magnetic layer 5 has excellent processing stability.

In detail, although not illustrated, when the inductor 1 does not include the processing stabilization layer 71 and includes only the first wire 2, the second wire 3, the first magnetic layer 4, the second magnetic layer 5, and the third magnetic layer 6; formation of the slit 21 in the second magnetic layer 5 warps (raises) an internal end of the third surface 13 of the second magnetic layer 5, which faces the slit 21, toward the one side in the thickness direction. This phenomenon causes the second magnetic layer 5 to move to the one side in the thickness direction while involving the surrounding binder when the slit 21 is formed in the second magnetic layer 5, because the magnetic particles are made of metals, less likely to crack, and has an approximately flat shape.

However, the inductor 1 of the embodiment includes the processing stabilization layer 71 as illustrated in FIG. 16B. The processing stabilization layer 71 contains, as an optional component, at least one selected from the group consisting of the first particles and the second particles.

Specifically, when the processing stabilization layer 71 does not include the particles, the deformation of the processing stabilization layer 71 caused by the above-described movement of the particles does not occur. Thus, the cured product in the processing stabilization layer 71 can suppress the deformation of the second magnetic layer 5.

When the processing stabilization layer 71 contains the approximately spherical-shaped first particles, the movement of the first particles involving the surrounding binder in the processing stabilization layer 71 is suppressed. Thus, the cured product in the processing stabilization layer 71 can suppress the deformation of the second magnetic layer 5.

Provided that the processing stabilization layer 71 contains the second particles made of an inorganic compound, the second particles are easily cracked in the formation of the slit 21 in the second magnetic layer 5 even when the second particles have an approximately flat shape. This is because the inorganic compound making up the second particles is brittle. Thus, the movement of the second particles in the processing stabilization layer 71 is suppressed. As a result, the cured product in the processing stabilization layer 71 can suppress the deformation of the second magnetic layer 5.

Accordingly, because including the above-described processing stabilization layer 71, the inductor 1 of the variation can suppress the deformation of the second magnetic layer 5 when the slit 21 is formed in the inductor 1.

The inductor 1 of the variation 1 includes the above-described second processing stabilization layer 72. Thus, for the above-described reasons, the deformation of the third magnetic layer 6 can be suppressed when the slit 22 is formed in the third magnetic layer 6.

Although not illustrated, the inductor 1 can include only the processing stabilization layer 71 without including the second processing stabilization layer 72.

The inductor 1 of the above-described variation (preferably, the inductor 1 including the processing stabilization layer 71 and the second processing stabilization layer 72) satisfies, for example, at least one of tests (a) to (e).

Test (a): The outer shape of the inductor 1 is processed into a 3 cm square piece to make a sample. A relative permeability μ1 of the sample at a frequency of 10 MHz is obtained. Thereafter, the sample is immersed in 200 mL of a copper sulfate plating solution containing 66 g/L of copper sulfate pentahydrate, 180 g/L of a sulfuric acid concentration, 50 ppm of chlorine, and TOP LUCINA at 25° C. for 120 minutes. Then, a relative permeability μ2 of the sample at a frequency of 10 MHz is obtained. The rate of change of the permeability before and after the immersion is obtained by the following formula. As a result, the change rate of the permeability of the sample is 5% or less.

$$\text{The change rate of the permeability (\%)} = |\mu1 - \mu2| / \mu1 \times 100$$

Test (b): The outer shape of the inductor 1 is processed into a 3 cm square piece to make a sample. A relative permeability μ3 of the sample at a frequency of 10 MHz is obtained. Thereafter, the sample is immersed in 200 mL of an acid activation aqueous solution containing 55 g/L of sulfuric acid at 25° C. for 1 minute. Then, a relative permeability μ4 of the sample at a frequency of 10 MHz is obtained. The rate of change of the permeability before and after the immersion is obtained by the following formula. As a result, the change rate of the permeability of the sample is 5% or less.

$$\text{The change rate of the permeability (\%)} = |\mu3 - \mu4| / \mu3 \times 100$$

Test (c): The outer shape of the inductor 1 is processed into a 3 cm square piece to make a sample. A relative permeability μ5 of the sample at a frequency of 10 MHz is obtained. Thereafter, the sample is immersed in 200 mL of Reduction Solution Securigant P manufactured by Atotech Japan at 45° C. for 5 minutes. Then, a relative permeability μ6 of the sample at a frequency of 10 MHz is obtained. The rate of change of the permeability before and after the immersion is obtained by the following formula. As a result, the change rate of the permeability of the sample is 5% or less.

$$\text{The change rate of the permeability (\%)} = |\mu5 - \mu6| / \mu5 \times 100$$

Test (d): The outer shape of the inductor 1 is processed into a 3 cm square piece to make a sample. A relative permeability μ7 of the sample at a frequency of 10 MHz is obtained. Thereafter, the sample is immersed in 200 mL of Concentrate Compact CP manufactured by Atotech Japan at 80° C. for 15 minutes. Then, a relative permeability μ8 of the sample at a frequency of 10 MHz is obtained. The rate of change of the permeability before and after the immersion is obtained by the following formula. As a result, the change rate of the permeability of the sample is 5% or less.

$$\text{The change rate of the permeability (\%)} = |\mu7 - \mu8| / \mu7 \times 100$$

Test (e): The outer shape of the inductor 1 is processed into a 3 cm square piece to make a sample. A relative permeability μ9 of the sample at a frequency of 10 MHz is obtained. Thereafter, the sample is immersed in 200 mL of Swelling Dip Securigant P manufactured by Atotech Japan at 60° C. for 5 minutes. Then, a relative permeability μ10 of the sample at a frequency of 10 MHz is obtained. The rate of change of the permeability before and after the immersion is obtained by the following formula. As a result, the change rate of the permeability of the sample is 5% or less.

$$\text{The change rate of the permeability (\%)} = |\mu9 - \mu10| / \mu9 \times 100$$

When test (a) is satisfied, the upper limit of the change rate of the permeability of the sample is preferably 4%, more preferably 3% in the test (a).

When test (a) is satisfied, the inductor 1 has excellent stability with respect to the immersion in the sulfuric acid copper solution of electrolytic copper plating.

When test (b) is satisfied, the upper limit of the change rate of the permeability of the sample is preferably 4%, more preferably 3% in the test (b).

When test (b) is satisfied, the inductor 1 has excellent stability with respect to the immersion in the acid activation solution.

When test (c) is satisfied, the upper limit of the change rate of the permeability of the sample is preferably 4%, more preferably 3% in the test (c).

The Reduction Solution Securigant P by Atotech Japan contains a sulfuric acid aqueous solution, and thus is used as a neutralizing solution (a neutralizing agent, or a neutralizing aqueous solution) in test (c). Accordingly, when test (c) is satisfied, the inductor 1 has excellent stability with respect to the immersion in the neutralizing solution.

When test (d) is satisfied, the upper limit of the change rate of the permeability of the sample is preferably 4%, more preferably 3% in the test (d).

The Concentrate Compact CP by Atotech Japan of test (d) contains a potassium permanganate solution. Accordingly, when test (d) is satisfied, the inductor 1 has excellent stability with respect to the immersion in the potassium permanganate solution in desmear (washing).

When test (e) is satisfied, the upper limit of the change rate of the permeability of the sample is preferably 4%, more preferably 3% in the test (e).

The Swelling Dip Securigant P by Atotech Japan is an aqueous solution containing glycol ethers and sodium hydroxide, and thus is used as a swelling solution in test (e). Accordingly, when test (e) is satisfied, the inductor 1 has excellent stability with respect to the immersion in the swelling solution.

Preferably, all the tests (a) to (e) are satisfied. Then, the inductor 1 has excellent stability with respect to the immersion in the sulfuric acid copper solution of electrolytic copper plating, the acid activation solution, the neutralizing solution, the potassium permanganate solution in desmear (washing), and the swelling solution. Thus, the inductor 1 has excellent stability in various processes using the solutions.

EXAMPLE

The present invention will be more specifically described below with reference to Preparation Examples, Examples, and Comparison Examples. The present invention is not limited to Preparation Examples, Examples, and Comparison Examples in any way. The specific numeral values used in the description below, such as mixing ratios (contents), physical property values, and parameters can be replaced with the corresponding mixing ratios (contents), physical property values, parameters in the above-described "DESCRIPTION OF EMBODIMENTS", including the upper limit values (numeral values defined with "or less", and "less than") or the lower limit values (numeral values defined with "or more", and "more than").

Preparation Example 1

(Preparation of Binder)

24.5 parts by mass of an epoxy resin (main agent), 24.5 parts by mass of phenol resin (curing agent), 1 parts by mass of an imidazole compound (curing accelerator), and 50 parts by mass of an acrylic resin (thermoplastic resin) were mixed, thereby preparing a binder.

Comparative Example 1

First, a first wire 2 and a second wire 3 were prepared. Each of the first wire 2 and second wire 3 had a diameter L1 of 260 μm. In addition, first magnetic sheets 25, a second magnetic sheet 26, and a third magnetic sheet 27 were produced in accordance with the types of the magnetic particles and filling rates shown Table 1.

As illustrated in FIG. 2A, subsequently, the second magnetic sheet 26, one of the first magnetic sheets 25, the first wire 2 and second wire 3, the other of the first magnetic sheets 25, and the third magnetic sheet 27 were sequentially disposed toward the other side in the thickness direction. The first wire 2 and second wire 3 has an interval L of 240 μm therebetween.

As illustrated in FIG. 2B, subsequently, the disposed sheets were heat pressed. In this manner, a first magnetic layer 4, a second magnetic layer 5 and a third magnetic layer 6 were formed. In this manner, an inductor 1 without including a suppression portion 7 was produced.

Example 1

As illustrated in FIG. 2C and FIG. 3, a slit 21 with a length (thickness) L3 of 60 μm was formed in a second magnetic layer 5 of the inductor 1 of Comparative Example 1, using a dicing saw 28.

In this manner, the inductor 1 including the suppression portion 7 having the slit 21 was produced.

Example 2

As illustrated in FIG. 1 and FIG. 2C, except that a second slit 22 with a length (thickness) L5 of 60 μm was formed in the third magnetic layer 6, an inductor 1 was produced in the same process as Example 1. The suppression portion 7 included the slit 21 and the second slit 22.

Example 3

As illustrated in FIG. 13, except that a first filling portion 37 and a second filling portion 38 were embedded instead of the slit 21 and the second slit 22 in the second magnetic layer 5 and the third magnetic layer 6, respectively, an inductor 1 including the suppression portion 7 having the first filling portion 37 and the second filling portion 38 was produced in the same process as Example 1.

Each of the first filling portion 37 and the second filling portion 38 was made of a polyimide resin in a solid state at room temperature and had a relative permeability of 1. The first filling portion 37 and the second filling portion 38 had a rectangular shape in the cross-sectional view before and after being embedded in the second magnetic layer 5 and the third magnetic layer 6, respectively.

Example 4

As illustrated in FIG. 7, except that an intermediate slit 29 communicated with the slit 21 and the second slit 22 was formed in the suppression portion 7, an inductor 1 was produced in the same process as Example 2.

Comparative Example 2 and Examples 5 to 8

Except that spherical magnetic particles were used instead of the flat magnetic particles in the second magnetic sheet 26 and third magnetic sheet 27, inductors 1 of Comparative Example 2 and Examples 5 to 8 were produced as shown in Table 2 in the same process as Comparative Example 1 and Examples 1 to 4.

<Evaluation>

The following items were evaluated and the results are shown in Tables 3 and 4.

<Crosstalk>

The coupling coefficient of the first wire 2 and second wire 3 of the inductor 1 of each Example was measured. As a reference, the coupling coefficient of the first wire 2 and second wire 3 of the inductor 1 of Comparative Example 1 was also measured. Next, the crosstalk was evaluated in conformity to the following criteria. The measurement was carried out using an impedance analyzer ("4291B" manufactured by Agilent Technologies, Inc.).

[Criteria]

Excellent: The coupling coefficient decreased by 40% or more in comparison with Comparative Example 1 or Comparative Example 2.

Good: The coupling coefficient decreased by 20% or more and less than 40% in comparison with Comparative Example 1 or Comparative Example 2.

<Inductance>

The mutual inductance of the first wire 2 and second wire 3 of the inductor 1 of each Example was measured. The inductance was evaluated in conformity to the following criteria. The measurement was carried out using an impedance analyzer ("4291B" manufactured by Agilent Technologies, Inc.).

[Criteria]

Good: 70% or more of the self-inductance was maintained in comparison with Comparative Example 1 or Comparative Example 2.

Fair: 50% or more and less than 70% of the self-inductance was maintained in comparison with Comparative Example 1 or Comparative Example 2.

<Superimposed DC Current Characteristics>

The rate of decrease in inductance of the inductor 1 was measured in each Example to evaluate the superimposed DC current characteristics. The measurement of the inductance decrease rate was carried out using an impedance analyzer ("65120B" manufactured by Kuwaki Electronics Co., Ltd.). In conformity to the following criteria, the inductance decrease rate was evaluated.

$$[\text{inductance in a state in which a DC bias current was not applied} - \text{inductance in a state in which a DC bias current of 10 A was applied}]/[\text{inductance in a state in which a DC bias current of 10 A was applied}]\times 100(\%)$$

[Criteria]

Good: The inductance decrease rate relative to Comparative Example 1 or Comparative Example 2 was 50% or less.

Bad: The inductance decrease rate relative to Comparative Example 1 or Comparative Example 2 was more than 50%.

TABLE 1

| Comparative Example 1 | | | Magnetic layer | | | Magnetic particles | | | | Number of |
|---|---|---|---|---|---|---|---|---|---|---|
| | | | Relative permeability in surface direction | Relative permeability in thickness direction | Thickness of each magnetic sheet [μm] | Shape | Median particle size [μm] | Type | Filling rate (% by volume) | magnetic sheets used for production |
| Magnetic sheet | One of first magnetic sheets | First magnetic layer | 12 | 12 | 60 | Spherical-shaped | 5 | Carbonyl iron | 60 | 2 |
| | The other of first magnetic sheets | | 12 | 12 | 60 | Spherical-shaped | 5 | Carbonyl iron | 60 | 2 |
| | Second magnetic sheet | Second magnetic layer | 53 | 5 | 28 | Flat-shaped | 40 | Fe—Si alloy | 60 | 6 |
| | Third magnetic sheet | Third magnetic layer | 53 | 5 | 28 | Flat-shaped | 40 | Fe—Si alloy | 60 | 6 |

TABLE 2

| Comparative Example 2 | | | Magnetic layer | | | Magnetic particles | | | | Number of |
|---|---|---|---|---|---|---|---|---|---|---|
| | | | Relative permeability in surface direction | Relative permeability in thickness direction | Thickness of each magnetic sheet [μm] | Shape | Median particle size [μm] | Type | Filling rate (% by volume) | magnetic sheets used for production |
| Magnetic sheet | One of first magnetic sheets | First magnetic layer | 12 | 12 | 60 | Spherical-shaped | 5 | Carbonyl iron | 60 | 2 |
| | The other of first magnetic sheets | | 12 | 12 | 60 | Spherical-shaped | 5 | Carbonyl iron | 60 | 2 |
| | Second magnetic sheet | Second magnetic layer | 30 | 30 | 56 | Spherical-shaped | 10 | Carbonyl iron | 65 | 3 |
| | Third magnetic sheet | Third magnetic layer | 30 | 30 | 56 | Spherical-shaped | 10 | Carbonyl iron | 65 | 3 |

TABLE 3

| | Comparative Example 1 | Example 1 | Example 2 | Example 3 | Example 4 |
|---|---|---|---|---|---|
| Corresponding Drawing | FIG. 2B | FIG. 3 | FIG. 1 | FIG. 13 | FIG. 7 |
| Suppression portion | Absence | First suppression portion (slit) | First suppression portion (slit) | First suppression portion (First filling portion) | First suppression portion (slit) |
| | | — | Second suppression portion (Second slit) | Second suppression portion (Second filling portion) | Second suppression portion (Second slit) |
| | | | — | — | Intermediate slit |
| Crosstalk | — | Good | Excellent | Good | Excellent |
| Inductance | Good | Good | Fair | Good | Fair |
| Superimposed DC current characteristics | Good | Good | Good | Good | Good |

TABLE 4

| | Comparative Example 2 | Example 5 | Example 6 | Example 7 | Example 8 |
|---|---|---|---|---|---|
| Corresponding Drawing | FIG. 2B | FIG. 3 | FIG. 1 | FIG. 13 | FIG. 7 |
| Suppression portion | Absence | First suppression portion (slit) | First suppression portion (slit) | First suppression portion (First filling portion) | First suppression portion (slit) |
| | | — | Second suppression portion (Second slit) | Second suppression portion (Second filling portion) | Second suppression portion (Second slit) |
| | | | — | — | Intermediate slit |
| Crosstalk | — | Good | Excellent | Good | Excellent |
| Inductance | Good | Good | Fair | Good | Fair |
| Superimposed DC current characteristics | Good | Good | Good | Good | Good |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The inductor is mounted on, for example, an electronic device.

DESCRIPTION OF REFERENCE NUMERALS

1 inductor
2 first wire
3 second wire
4 first magnetic layer
5 second magnetic layer
6 third magnetic layer
7 suppression portion
10 inner peripheral surface
11 first surface
12 second surface
13 third surface
14 fourth surface
17 outer peripheral surface
21 slit
22 second slit
35 void
37 first filling portion
38 second filling portion
71 processing stabilization layer
72 second processing stabilization layer
L2 length of the slit in the thickness direction
L3 length of the slit in the adjacent direction
L4 length of the second slit in the thickness direction
L5 length of the second slit in the adjacent direction

The invention claimed is:

1. An inductor comprising:

a first wire and a second wire adjacent to each other and separated by an interval;

a first magnetic layer having a first surface having a shape and including at least one convex portion and continuing in a surface direction, a second surface having a shape and including at least one convex portion and separated from the first surface by an interval in a thickness direction and continuing in the surface direction, an inner peripheral surface located between the first surface and the second surface and being in contact with an outer peripheral surface of the first wire and an outer peripheral surface of the second wire;

a second magnetic layer disposed on the first surface; and a third magnetic layer disposed on the second surface, wherein the second magnetic layer has a third surface facing the first surface and separated from the first surface by an interval in the thickness direction, at least the first wire or the second wire is disposed in the interval between the at least one convex portion of the first surface and the at least one convex portion of the second surface, a relative permeability of each of the second magnetic layer and the third magnetic layer is higher than a relative permeability of the first magnetic layer, the inductor further comprises a suppression portion that is located between the first wire and the second wire when being projected in the thickness direction and is configured to suppress magnetic coupling between the first wire and the second wire, and the suppression portion includes a first suppression portion located between the first surface and the third surface.

2. The inductor according to claim 1, wherein the first suppression portion faces the first surface.

3. The inductor according to claim 1, wherein the first suppression portion is exposed from the third surface.

4. The inductor according to claim 1, wherein a length of the first suppression portion in the thickness direction is larger than a length of the first suppression portion in an adjacent direction in which the first wire and the second wire are adjacent to each other.

5. The inductor according to claim 1, wherein the first suppression portion is an open slit formed in the second magnetic layer.

6. The inductor according to claim 1, wherein the first suppression portion is a first filling portion filling a void formed in the second magnetic layer, and a relative permeability of the first filling portion is lower than the relative permeability of the first magnetic layer.

7. The inductor according to claim 1, further comprising a processing stabilization layer disposed on the third surface of the second magnetic layer.

8. The inductor according to claim 1, wherein the third magnetic layer has a fourth surface facing the second surface and separated from the second surface by an interval in the thickness direction, and the suppression portion further includes a second suppression portion located between the second surface and the fourth surface.

9. The inductor according to claim 8, wherein the second suppression portion faces the second surface.

10. The method according to claim 8, wherein the second suppression portion is exposed from the fourth surface.

11. The inductor according to claim 8, wherein a length of the second suppression portion in the thickness direction is larger than a length of the second suppression portion in the adjacent direction in which the first wire and the second wire are adjacent to each other.

12. The inductor according to claim 8, wherein the second suppression portion is a second open slit formed in the third magnetic layer.

13. The inductor according to claim 8, wherein the second suppression portion is a second filling portion filling a void formed in the third magnetic layer, and a relative permeability of the second filling portion is lower than the relative permeability of the first magnetic layer.

14. The inductor according to claim 8, further comprising a second processing stabilization layer disposed on the fourth surface of the third magnetic layer.

* * * * *